(12) United States Patent
Fong et al.

(10) Patent No.: US 8,315,229 B2
(45) Date of Patent: Nov. 20, 2012

(54) METHODS AND APPARATUS FOR WIRELESS COMMUNICATION

(75) Inventors: Mo-han Fong, Ottawa (CA); Hang Zhang, Nepean (CA); Sophie Vrzic, Nepean (CA); Robert Novak, Ottawa (CA)

(73) Assignee: Research In Motion Limited, Waterloo, Ontario (CA)

( * ) Notice: Subject to any disclaimer, the term of this patent is extended or adjusted under 35 U.S.C. 154(b) by 257 days.

(21) Appl. No.: 12/801,978

(22) Filed: Jul. 6, 2010

(65) Prior Publication Data

US 2011/0080893 A1 Apr. 7, 2011

Related U.S. Application Data

(63) Continuation-in-part of application No. 12/806,185, filed on Jul. 6, 2009.

(60) Provisional application No. 61/078,505, filed on Jul. 7, 2008.

(51) Int. Cl.
*H04W 4/00* (2009.01)

(52) U.S. Cl. ....................................................... 370/331

(58) Field of Classification Search .................. 370/203, 370/204–215, 229–240, 310–337, 338–350, 370/395.1, 395.3, 395.4, 395.41, 395.42, 370/395.5, 395.52, 395.53, 412–421, 431–457, 370/458–463, 464–497, 498–522, 523–520, 370/521–529

See application file for complete search history.

(56) References Cited

U.S. PATENT DOCUMENTS

| | | | | |
|---|---|---|---|---|
| 4,346,470 A | * | 8/1982 | Alvarez et al. | 370/324 |
| 4,675,863 A | * | 6/1987 | Paneth et al. | 370/334 |
| 4,817,089 A | * | 3/1989 | Paneth et al. | 370/280 |
| 4,912,705 A | * | 3/1990 | Paneth et al. | 370/334 |
| 5,022,024 A | * | 6/1991 | Paneth et al. | 370/334 |
| 5,119,375 A | * | 6/1992 | Paneth et al. | 370/345 |

(Continued)

FOREIGN PATENT DOCUMENTS

CA 2554778 A1 9/2005

(Continued)

OTHER PUBLICATIONS

Office Action (including Notice of References Cited) from corresponding U.S. Appl. No. 12/806,184 issued on Apr. 21, 2011, 9 pages.

(Continued)

*Primary Examiner* — Kwang B Yao
*Assistant Examiner* — Jung-Jen Liu
(74) *Attorney, Agent, or Firm* — Fish & Richardson P.C.

(57) ABSTRACT

One method of wireless communication involves acknowledging that an anchor base station received a handover indication signal. Another method involves: receiving, from base stations of an active set, offset signals identifying a respective differences in time between a reference time and respective times when the base station received a ranging signal from a mobile station; and transmitting, to the mobile station, a ranging control signal in response to the respective offset signals. Another method involves transmitting, to a mobile station in response to an active set signal, a system configuration information signal including system configuration information of a base station in an active set. Another method involves determining an uplink control channel power parameter in response to channel condition signals received from base stations in an active set. Another method involves transmitting a control signal to base stations in an active set on respective control channels. Apparatuses are also disclosed.

11 Claims, 26 Drawing Sheets

U.S. PATENT DOCUMENTS

| | | | |
|---|---|---|---|
| 5,121,391 A * | 6/1992 | Paneth et al. | 370/341 |
| 5,657,358 A * | 8/1997 | Panech et al. | 375/356 |
| 5,687,194 A * | 11/1997 | Paneth et al. | 375/283 |
| 5,734,678 A * | 3/1998 | Paneth et al. | 375/240 |
| 5,887,261 A | 3/1999 | Csapo et al. | |
| 6,014,374 A * | 1/2000 | Paneth et al. | 370/345 |
| 6,282,180 B1 * | 8/2001 | Paneth et al. | 370/330 |
| 6,393,002 B1 * | 5/2002 | Paneth et al. | 370/330 |
| 6,771,667 B2 * | 8/2004 | Paneth et al. | 370/478 |
| 6,842,440 B2 * | 1/2005 | Paneth et al. | 370/330 |
| 6,954,470 B2 * | 10/2005 | Paneth et al. | 370/478 |
| 7,020,701 B1 * | 3/2006 | Gelvin et al. | 709/224 |
| 7,844,687 B1 * | 11/2010 | Gelvin et al. | 709/220 |
| 7,995,454 B2 * | 8/2011 | Geile et al. | 370/206 |
| 8,140,658 B1 * | 3/2012 | Gelvin et al. | 709/224 |
| 2004/0081112 A1 | 4/2004 | Chen et al. | |
| 2004/0181800 A1 * | 9/2004 | Rakib et al. | 725/25 |
| 2004/0198467 A1 | 10/2004 | Orlik et al. | |
| 2005/0031047 A1 | 2/2005 | Maltsev et al. | |
| 2008/0037669 A1 | 2/2008 | Pan et al. | |
| 2008/0056119 A1 * | 3/2008 | Dapper et al. | 370/210 |
| 2008/0080459 A1 | 4/2008 | Kotecha et al. | |
| 2008/0139207 A1 | 6/2008 | Son et al. | |
| 2008/0225690 A1 * | 9/2008 | Dapper et al. | 370/210 |
| 2008/0225691 A1 * | 9/2008 | Dapper et al. | 370/210 |
| 2008/0305745 A1 | 12/2008 | Zhang | |
| 2009/0161591 A1 | 6/2009 | Ahmadi et al. | |
| 2011/0080893 A1 * | 4/2011 | Fong et al. | 370/331 |
| 2011/0242963 A1 * | 10/2011 | Dapper et al. | 370/210 |

FOREIGN PATENT DOCUMENTS

| | | |
|---|---|---|
| CA | 2603148 A1 | 10/2006 |
| EP | 0415810 A1 | 3/1991 |
| EP | 2061173 A1 | 5/2009 |
| WO | 94/11957 A1 | 5/1994 |
| WO | 03/084092 A2 | 10/2003 |
| WO | 2007/053954 A1 | 5/2007 |
| WO | 2008/021062 A1 | 2/2008 |
| WO | 2008/075843 A1 | 6/2008 |
| WO | 2009/002097 A1 | 12/2008 |

OTHER PUBLICATIONS

Office Action for related U.S. Appl. No. 12/589,547, Oct. 7, 2011, 9 pages.

Office Action for corresponding U.S. Appl. No. 12/806,185, Jan. 9, 2012, 7 pages.

IEEE 802.16/2004.

Draft IEEE 802.16m System Description Document, IEEE 802.16m-08/003r1, dated Apr. 15, 2008.

IEEE 802.16e-2005.

IEEE802.16/2009.

Report ITU-R M.2072.

Hunziker et al.; "Feedback-Aided Selective Subspace Retransmission for Outage-Free Spatial Multiplexing"; Information, Communications & Signal Processing; 2007 6th International Conference Feb. 12, 2008.

Islam et al.; "Space-Time Block Coding in MIMO Cognitive Networks with Known Channel Correlations"; Wireless Technology, 2008; EuWiT 2008 European Conference Jan. 19, 2009.

PCT/CA2010/001046 "International Search Report" dated Dec. 30, 2010, 3 pages.

PCT/CA2010/001046 "Written Opinion" dated Dec. 30, 2010, 6 pages.

Mohammad Ali Maddah-Ali et al.; "Communication Over MIMO X Channels: Interference Alignment, Decomposition, and Performance Analysis"; IEEE Transactions on Information Theory, vol. 54, No. 8, Aug. 2008, 3457-3470.

Charan Langton; Intuitive Guide to Principles of Communications: Orthogonal Frequency Division Multiplex (OFDM) Tutorial; www.complextoreal.com; 2004.

3GPP TSG-Ran Working Group 1 Meeting 54b, Prague, Czech Republic, Sep. 29-Oct. 3, 2008.

Wikipedia "Orthogonal frequency-division multiple access" Jun. 21, 2010.

Wikipedia "Orthogonal frequency-division multiplexing" Jun. 22, 2010.

International Search Report and Written Opinion of corresponding PCT/CA2010/001530 dated Feb. 2, 2011, 12 pages.

International Search Report and Written Opinion of corresponding PCT/CA2010/001046 dated Dec. 30, 2010, 9 pages.

International Search Report and Written Opinion of corresponding PCT/CA2010/001529 dated Jan. 27, 2011, 12 pages.

International Search Report and Written Opinion of corresponding PCT/CA2010/001042 dated Sep. 17, 2010, 9 pages.

International Search Report and Written Opinion of corresponding PCT/CA2010/001045 dated Nov. 15, 2010, 10 pages.

* cited by examiner

Preamble Index Message ← 190

Active Set Message ← 202

Channel Condition Request Message ← 244

Channel Condition Message ← 250

Power Control Message ← 266

METHODS AND APPARATUS FOR WIRELESS COMMUNICATION

CROSS-REFERENCES TO RELATED APPLICATIONS

This application is a continuation-in-part of non-provisional application Ser. No. 12/806,185 resulting from a conversion under 37 C.F.R. § 1.53(c)(3) of U.S. provisional patent application No. 61/223,162 filed Jul. 6, 2009, and which claims the benefit of U.S. provisional patent application No. 61/078,505 filed Jul. 7, 2008, which is incorporated by reference herein in its entirety. U.S. patent application Ser. No. 12/806,185 (converted from U.S. provisional patent application No. 61/223,162) is hereby incorporated by reference in its entirety.

BACKGROUND OF THE INVENTION

1. Field of Invention

The invention relates generally to wireless communication, and more particularly to methods and apparatus related to handovers in wireless communication.

2. Description of Related Art

The IEEE *Standard for Local and metropolitan area networks, Part 16: Air Interface for Fixed and Mobile Broadband Wireless Access Systems, Amendment 2: Physical and Medium Access Control Layers for Combined Fixed and Mobile Operation in Licensed Bands and Corrigendum 1* dated Feb. 28, 2006 (the "IEEE 802.16e Standard") prescribed various standards for broadband wireless access systems, and is incorporated by reference herein in its entirety. For example, the IEEE 802.16e Standard prescribed various protocols for handing over a mobile station from an anchor base station to a target base station. The considerations for when a mobile station will effect a handover procedure from a anchor base station to a target base station are outside the scope of the IEEE 802.16e Standard, but generally a mobile station will communicate with an anchor base station for a period of time, and then initiate a handover procedure from the anchor base station to a target base station, following which the mobile station will communicate instead with the target base station when, for example, the mobile station has moved to a location where communication with the target base station is more effective than communication with the anchor base station.

The IEEE 802.16e Standard has some shortcomings. For example, before a mobile station can complete a handover to a target base station, the mobile station requires certain system configuration information (SCI) about the target base station, and the protocols prescribed by the IEEE 802.16e Standard for conveying such system configuration information of the target base station to the mobile station can be cumbersome, and can cause undesirable delays during the handover. Also, a mobile station typically transmits various media access control (MAC) messages' (which may also be referred to simply as "control messages") to initiate a handover procedure, but the IEEE 802.16e Standard does not include a satisfactory protocol for facilitating reception of such MAC messages at various base stations that may be prospective target base stations for a handover. Further, before a mobile station can complete a handover to a target base station, the mobile station may desirably acquire data representing a distance between the mobile station and the target base station, so that the mobile station can transmit uplink signals at times calculated to cause those signals to be received at the target base station at times that are assigned for uplink signals from the base station, thereby avoiding interference with uplink signals from other mobile stations. However, the protocols prescribed by the IEEE 802.16e Standard for acquiring such data may be cumbersome and can cause unnecessary delays during handover. Still further, the IEEE 802.16e Standard does not prescribe acknowledgement by an anchor base station of an indication by a mobile station that the mobile station will perform a handover from the anchor base station to a target base station. Therefore, if the anchor base station did not receive the indication, or received the indication in error, then the anchor base station may continue attempts to communicate with the base station after the base station has completed a handover to the target base station, which may cause unnecessary interference and congestion. Also, if the anchor base station did not receive the indication, then the anchor base station may not have informed the target base station that the mobile station will perform a handover to the target base station, in which case the target base station may not be prepared to communicate with the mobile station, and a communication interruption may result.

SUMMARY OF THE INVENTION

In accordance with one illustrative embodiment, there is provided a method of facilitating a handover of a mobile station from an anchor base station to a target base station. The method involves: receiving, at the anchor base station from the mobile station, a handover indication signal indicating that the mobile station will perform the handover from the anchor base station to the target base station; and transmitting, to the mobile station, an acknowledgment signal acknowledging that the anchor base station received the handover indication signal.

In accordance with another illustrative embodiment, there is provided a base station apparatus including: an interface for facilitating radio communication with a mobile station; and a processor in communication with the interface. The processor is operably configured to: receive, from the interface, a handover indication signal from the mobile station indicating that the mobile station will perform a handover from the base station apparatus to a target base station; and cause the interface to transmit, to the mobile station, an acknowledgment signal acknowledging that the base station apparatus received the handover indication signal.

In accordance with another illustrative embodiment, there is provided a base station apparatus including: provisions for receiving a handover indication signal from a mobile station indicating that the mobile station will perform a handover from the base station apparatus to a target base station; and provisions for transmitting, to the mobile station, an acknowledgment signal acknowledging that the base station apparatus received the handover indication signal.

In accordance with another illustrative embodiment, there is provided a method of facilitating acquisition, by a mobile station in radio communication with an anchor base station, of data representing distances between the mobile station and base stations of an active set of base stations in radio communication with the mobile station. The active set includes a subset of neighbor base stations of the anchor base station. The method involves: transmitting, from the anchor base station to each other base station of the active set, a ranging resource signal identifying a reference code and a reference time associated with the mobile station; causing the mobile station to transmit a ranging signal including the reference code to each base station of the active set at a time in response to the reference time, such that each base station of the active set receives the ranging signal at a respective time; receiving, from each base station of the active set, a respective offset signal identifying a respective difference in time between the reference time and the respective time when the base station of the active set received the ranging signal; and transmitting, to the mobile station, a ranging control signal in response to the respective offset signals.

The method may further involve generating the reference code from a pseudo-randomly generated code.

Transmitting the ranging control signal may involve transmitting a ranging control signal representing an average of the respective differences in time between the reference time and the respective times when each base station of the active set received the ranging signal.

Transmitting the ranging control signal may involve transmitting a plurality of ranging control signals, each one of the plurality of ranging control signals associated with a respective base station of the active set and representing the respective difference in time between the reference time and the respective time when the base station of the active set received the ranging signal.

The active set may further include the anchor base station.

In accordance with another illustrative embodiment, there is provided a base station apparatus including: a first interface for facilitating radio communication with a mobile station; a second interface for facilitating communication with at least one neighbor base station in an active set in radio communication with the mobile station; and a processor in communication with the first and second interfaces. The processor is operably configured to: cause the second interface to transmit, to the at least one neighbor base station in the active set, a ranging resource signal identifying a reference code and a reference time associated with the mobile station; cause the first interface to transmit, to the mobile station, a ranging command signal directing the mobile station to transmit a ranging signal including the reference code to each base station in the active set at a time in response to the reference time, such that each base station in the active set receives the ranging signal at a respective time; receive, from the second interface, a respective offset signal from each neighbor base station in the active set, each respective offset signal identifying a respective difference in time between the reference time and the respective time when the neighbor base station in the active set received the ranging signal; and cause the first interface to transmit, to the mobile station, a ranging control signal in response to each of the respective offset signals.

The processor may be further operably configured to generate the reference code from a pseudo-randomly generated code.

The ranging control signal may represent an average of each of the respective differences in time between the reference time and the respective time when each base station in the active set received the ranging signal.

The ranging control signal may include a plurality of ranging control signals, each one of the plurality of ranging control signals associated with a respective one of each base station of the active set, and representing the respective difference in time between the reference time and the respective time when the respective base station received the ranging signal.

The active set may further include the apparatus, and the processor may be further operably configured to: receive, from the first interface, the ranging signal from the mobile station; calculate a difference in time between the reference time and a time when the apparatus received the ranging signal from the mobile station; and cause the first interface to transmit, to the mobile station, the ranging control signal in response to the difference in time between the reference time and the time when the apparatus received the ranging signal from the mobile station.

In accordance with another illustrative embodiment, there is provided a base station apparatus configured for radio communication with a mobile station and for communication with at least one neighbor base station in an active set in radio communication with the mobile station. The apparatus includes: provisions for transmitting, to the at least one neighbor base station in the active set, a ranging resource signal identifying a reference code and a reference time associated with the mobile station; provisions for transmitting, to the mobile station, a ranging command signal directing the mobile station to transmit a ranging signal including the reference code to each base station in the active set at a time in response to the reference time, such that each base station in the active set receives the ranging signal at a respective time; provisions for receiving a respective offset signal from each base station in the active set, each respective offset signal identifying a respective difference in time between the reference time and the respective time when the base station in the active set received the ranging signal; and provisions for transmitting, to the mobile station, a ranging control signal in response to each of the respective offset signals.

In accordance with another illustrative embodiment, there is provided a method of distributing system configuration information of a base station. The method involves: receiving, from a first mobile station having a first active set of base stations, a first active set signal indicating that the first mobile station has added the base station to the first active set; and in response to receiving the first active set signal, transmitting, to the first mobile station, a system configuration information signal including the system configuration information of the base station.

The system configuration information of the base station may include one or more of the information in the group consisting of: an identifier of the base station; an identifier of a preamble index of the base station; an identifier of a subchannel index of the base station; frequency assignment information for the base station; a time/frequency synchronization indicator associated with the base station; uplink channel information for the base station; downlink channel information for the base station; a trigger reference indicator associated with the base station; the equivalent isotropically radiated power of the base station; handover information for the base station; scheduling service information for the base station; supported mobility feature information for the base station; a paging group identifier associated with the base station; an identifier of channel bandwidth of the base station; an identifier of a cyclic prefix of the base station; an identifier of frame duration of the base station; an identifier of a fast-Fourier transform size of the base station; and an operation mode of the starting subchannelization of a frame and channel number of the base station.

The method may further involve receiving, from a second mobile station having a second active set of base stations, a second active set signal indicating that the second mobile station has added the base station to the second active set. Transmitting the system configuration information signal to the first mobile station may involve multicasting, in response to receiving the first and second indicator signals, the system configuration information signal to the first and second mobile stations.

In accordance with another illustrative embodiment, there is provided a base station apparatus including: an interface for facilitating radio communication with a first mobile station having a first active set of base stations; a computer-readable memory having a store for storing system configuration information of a plurality of base stations; and a processor in communication with the interface and the computer-readable memory. The processor is operably configured to: receive, from the interface, a first active set signal, from the first mobile station, indicating that the first mobile station has added one of the plurality of base stations to the first active set; and cause the interface to transmit to the first mobile station, in response to receiving the first active set signal, a system configuration information signal including the system configuration information of the one of the plurality of base stations.

The system configuration information of the base station may include one or more of the information in the group consisting of: an identifier of the base station; an identifier of a preamble index of the base station; an identifier of a subchannel index of the base station; frequency assignment information for the base station; a time/frequency synchronization indicator associated with the base station; uplink channel information for the base station; downlink channel information for the base station; a trigger reference indicator associated with the base station; the equivalent isotropically radiated power of the base station; handover information for the base station; scheduling service information for the base station; supported mobility feature information for the base station; a paging group identifier associated with the base station; an identifier of channel bandwidth of the base station; an identifier of a cyclic prefix of the base station; an identifier of frame duration of the base station; an identifier of a fast-Fourier transform size of the base station; and an operation mode of the starting subchannelization of a frame and channel number of the base station.

The processor may be further operably configured to receive, from the interface, a second active set signal, from a second mobile station having a second active set of base stations, indicating that the second mobile station has added the one of the plurality of base stations to the second active set. The processor may be further operably configured to cause the interface to multicast, in response to receiving the first and second indicator signals, the system configuration signal to the first and second mobile stations.

In accordance with another illustrative embodiment, there is provided a base station apparatus including: provisions for storing system configuration information of a plurality of base stations; provisions for receiving an active set signal, from a mobile station having an active set, indicating that the mobile station has added one of the plurality of base stations to the active set; and provisions for transmitting to the mobile station, in response to receiving the active set signal, a system configuration information signal including the system configuration information of the one of the plurality of base stations.

In accordance with another illustrative embodiment, there is provided a method of controlling a mobile station in radio communication over an uplink control channel with a plurality of base stations. The method involves: receiving a respective channel condition signal from each one of the plurality of base stations, each respective channel condition signal indicating a respective channel condition of control signals received from the mobile station over the uplink control channel at the one of the plurality of base stations; determining an uplink control channel power parameter in response to the respective channel condition signals; and transmitting, to the mobile station, a power control signal including the uplink control channel power parameter.

Each of the channel conditions may include a signal-to-noise ratio.

Determining the uplink control channel power parameter may involve determining a ratio of: a threshold signal-to-noise ratio; and a lowest one of the respective signal-to-noise ratios of the control signals received from the mobile station over the uplink control channel at each one of the plurality of base stations.

In accordance with another illustrative embodiment, there is provided a base station apparatus including: a first interface for facilitating radio communication with a mobile station; a second interface for facilitating communication with at least one neighbor base station in an active set in radio communication with the mobile station; and a processor in communication with the first and second interfaces. The processor is operably configured to: receive, from the second interface, a respective channel condition signal from each neighbor base station of the active set, each respective channel condition signal indicating a respective channel condition of control signals received from the mobile station over the uplink control channel at the neighbor base station of the active set; determine an uplink control channel power parameter in response to: a channel condition of control signals received from the mobile station over the uplink control channel at the apparatus; and the respective channel condition signals received from the at least one neighbor base station of the active set; and cause the first interface to transmit, to the mobile station, a power control signal including the uplink control channel power parameter.

Each of the channel conditions may include a signal-to-noise ratio.

The processor may be operably configured to determine the uplink control channel power parameter in response to a ratio of: a threshold signal-to-noise ratio; and a lowest one of: the signal-to-noise ratio of the control signals received from the mobile station over the uplink control channel at the apparatus; and the respective signal-to-noise ratios of the control signals received from the mobile station over the uplink control channel at each neighbor base station of the active set.

In accordance with another illustrative embodiment, there is provided a base station apparatus configured for radio communication with a mobile station and for communication with at least one neighbor base station in an active set in radio communication with the mobile station. The apparatus includes: provisions for receiving a respective channel condition signal from each neighbor base station of the active set, each respective channel condition signal indicating a respective channel condition of control signals received from the mobile station over the uplink control channel at the neighbor base station of the active set; provisions for determining an uplink control channel power parameter in response to: a channel condition of control signals received from the mobile station over the uplink control channel at the apparatus; and the respective channel condition signals received from the at least one neighbor base station of the active set; and provisions for transmitting, to the mobile station, a power control signal including the uplink control channel power parameter.

In accordance with another illustrative embodiment, there is provided a method of transmitting a control signal to a plurality of base stations in an active set of a mobile station. The method involves: for each base station in the active set, transmitting the control signal to the base station on a respective control channel.

In accordance with another illustrative embodiment, there is provided a mobile station apparatus including: an interface for facilitating radio communication with a plurality of base stations in an active set of the apparatus; and a processor in communication with the interface and operably configured to transmit the control signal to each base station in the active set on a respective control channel.

In accordance with another illustrative embodiment, there is provided a mobile station apparatus including: provisions for facilitating radio communication with a plurality of base stations in an active set of the apparatus; and provisions for transmitting the control signal to each base station in the active set on a respective control channel.

Other aspects and features of the present invention will become apparent to those ordinarily skilled in the art upon review of the following description of specific embodiments in conjunction with the accompanying figures.

BRIEF DESCRIPTION OF THE DRAWINGS

Embodiments of the present application will now be described, by way of example only, with reference to the accompanying drawing figures, wherein.

Like reference numerals are used in different figures to denote similar elements.

DETAILED DESCRIPTION

Wireless System Overview

Figure 1:
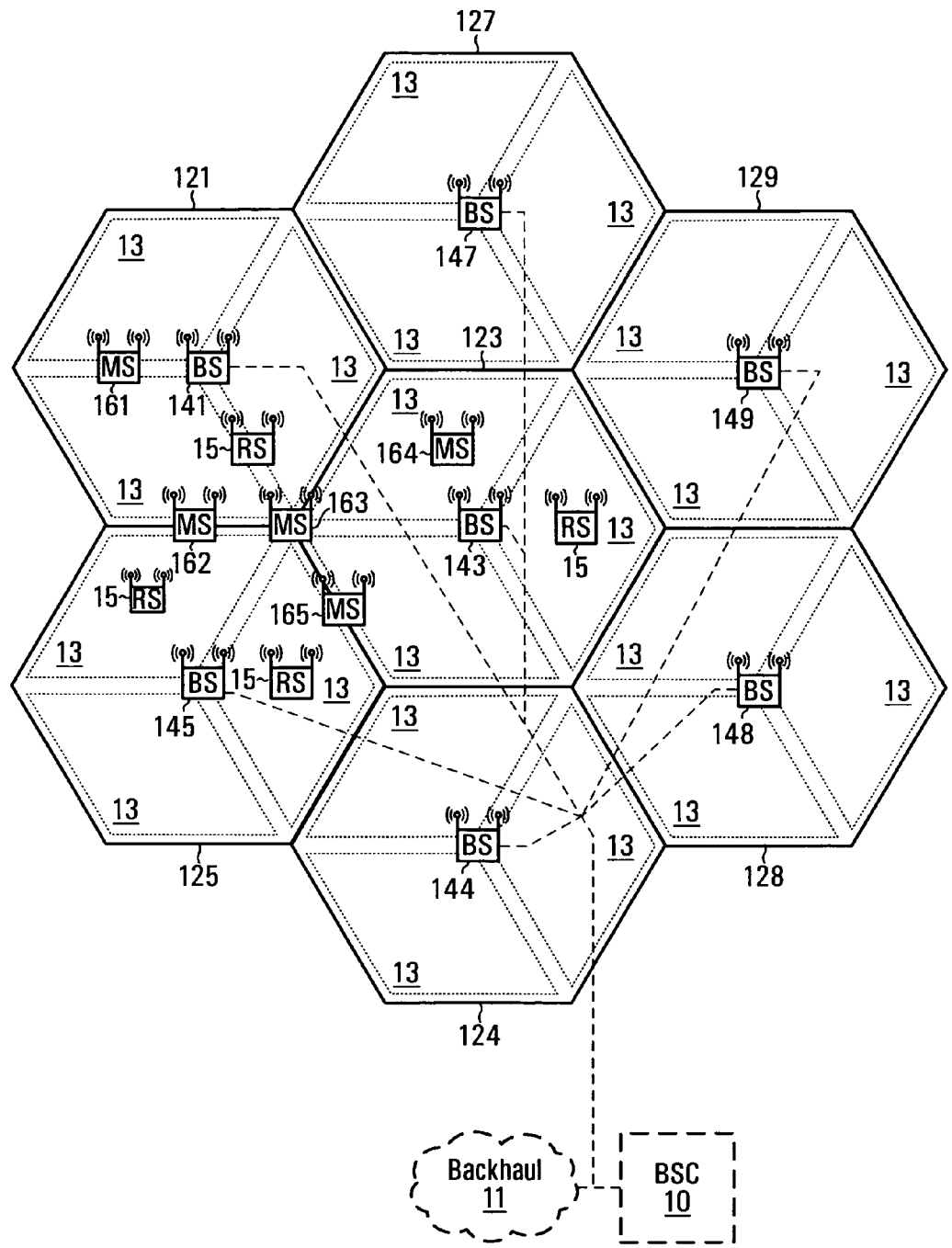
FIG. 1 is a block diagram of an example cellular communication system.

Referring to the drawings, FIG. 1 shows a base station controller (BSC) 10 which controls wireless communications within multiple cells 121, 123, 124, 125, 127, 128, and 129, which cells are served by corresponding base stations (BS) 141, 143, 144, 145, 147, 148, and 149 respectively. In some configurations, each cell is further divided into multiple sectors 13 or zones (not shown). In general, each base station 141, 143, 144, 145, 147, 148, and 149 facilitates communications using Orthogonal Frequency-Division Multiplexing (OFDM) digital modulation scheme with mobile stations (MS) and/or wireless terminals 161, 162, 163, 164, and 165, which are within one of the cells 121, 123, 124, 125, 127, 128, and 129.

Movement of the mobile stations 161, 162, 163, 164, and 165 in relation to the base stations 141, 143, 144, 145, 147, 148, and 149 results in significant fluctuation in channel conditions. As illustrated, the base stations 141, 143, 144, 145, 147, 148, and 149 and the mobile stations 161, 162, 163, 164, and 165 may include multiple antennas to provide spatial diversity for communications. In some configurations, relay stations 15 may assist in communications between the base stations 141, 143, 144, 145, 147, 148, and 149 and the mobile stations 161, 162, 163, 164, and 165. The mobile stations 161, 162, 163, 164, and 165 can be handed off from any of the cells 121, 123, 124, 125, 127, 128, and 129, the sectors 13, the zones (not shown), the base stations 141, 143, 144, 145, 147, 148, and 149, or the relay stations 15 to another one of the cells 121, 123, 124, 125, 127, 128, and 129, the sectors 13, the zones (not shown), the base stations 141, 143, 144, 145, 147, 148, and 149, or the relay stations 15. In some configurations, the base stations 141, 143, 144, 145, 147, 148, and 149 communicate with each other and with another network (such as a core network or the internet, both not shown) over a backhaul network 11. In some configurations, the base station controller 10 is not needed.

Base Station

Figure 2:
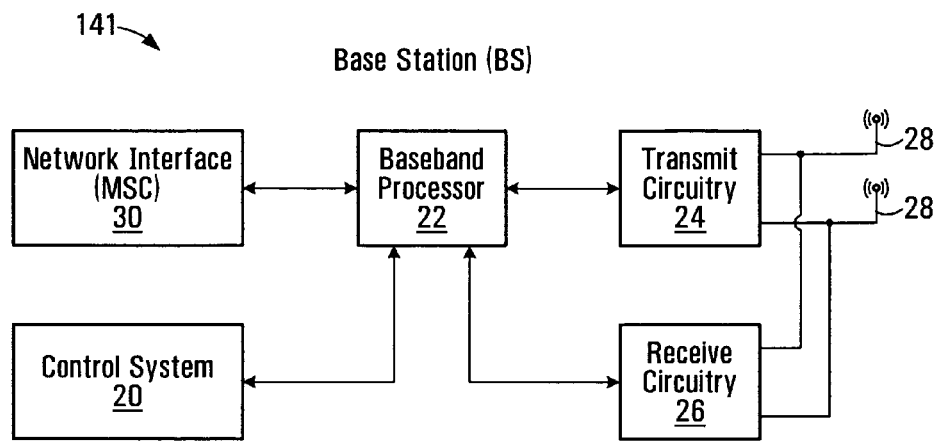
FIG. 2 is a block diagram of an example base station shown in FIG. 1.
Figure 3:
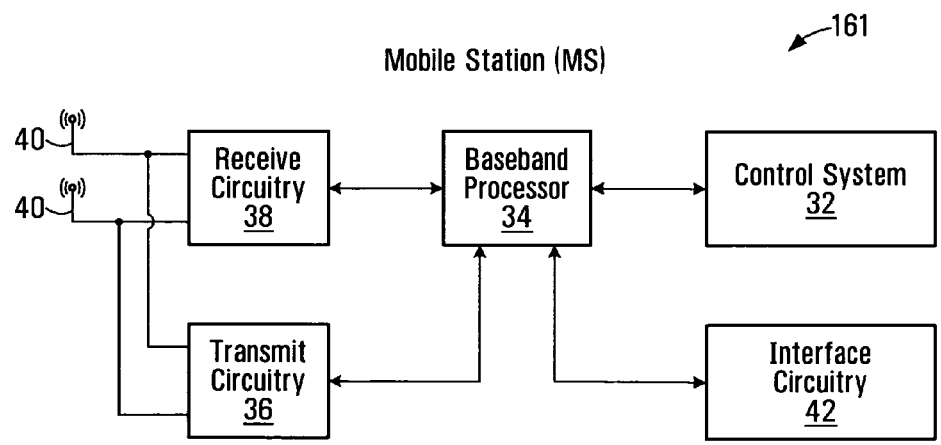
FIG. 3 is a block diagram of an example mobile station shown in FIG. 1.

With reference to FIG. 2, the base station 141 is illustrated, and the base stations 143, 144, 145, 147, 148, and 149 are substantially the same as the base station 141. The base station 141 generally includes a control system 20, a baseband processor 22, transmit circuitry 24, receive circuitry 26, multiple transmit antennas 28, and a network interface 30. The receive circuitry 26 receives radio frequency signals bearing information from one or more remote transmitters provided by the mobile stations 161, 162, 163, 164, and 165 (the mobile station 161 is illustrated in FIG. 3) and the relay stations 15 (illustrated in FIG. 4). A low noise amplifier and a filter (not shown) may cooperate to amplify and remove broadband interference from the received signal for processing. Downconversion and digitization circuitry (not shown) will then downconvert the filtered, received signal to an intermediate or baseband frequency signal, which is then digitized into one or more digital streams.

The baseband processor 22 processes the digitized streams to extract the information or data bits conveyed in the received signal. This processing typically comprises demodulation, decoding, and error correction operations. As such, the baseband processor 22 is generally implemented in one or more digital signal processors (DSPs) or application-specific integrated circuits (ASICs). The information is then sent across a wireless network via the network interface 30 or transmitted to one of the mobile stations 161, 162, 163, 164, and 165 serviced by one or more of the base stations 141, 143, 144, 145, 147, 148, and 149, either directly or with the assistance of one of the relay stations 15. The network interface 30 thus facilitates communication with the base stations 143, 144, 145, 147, 148, and 149, for example.

To perform transmitting functions, the baseband processor 22 receives digitized data, which may represent voice, data, or control information, from the network interface 30 under the control of the control system 20, and produces encoded data for transmission. The encoded data is output to the transmit circuitry 24, where it is modulated by one or more carrier signals having a desired transmit frequency or frequencies. A power amplifier (not shown) will amplify the modulated carrier signals to a level appropriate for transmission, and deliver the modulated carrier signals to the transmit antennas 28 through a matching network (not shown). The antennas 28 thus function as an interface for facilitating radio communication with one or more of the mobile stations 161, 162, 163, 164, and 165. Modulation and processing details are described in greater detail below.

Figure 14:
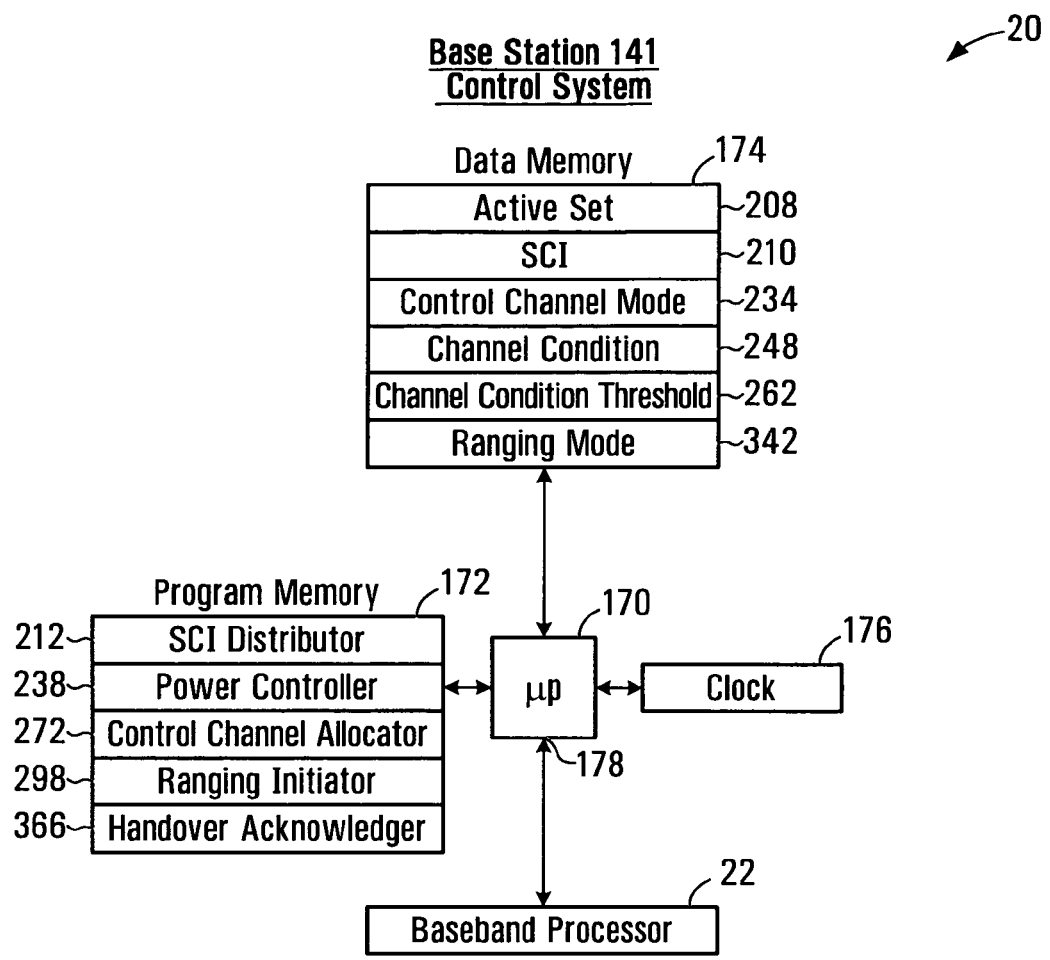
FIG. 14 is a schematic representation of an example control system of the base station of FIG. 2.

Referring to FIG. 14, the control system 20 is illustrated schematically. The control system 20 in the embodiment shown includes a microprocessor 170, and includes a program memory 172, a data memory 174, and a clock 176 all in communication with the microprocessor 170. The microprocessor 170 also includes a baseband processor interface 178 for communicating with the baseband processor 22 (shown in FIG. 2). Therefore, in the embodiment shown, the control system 20 communicates with the other base stations and the mobile stations shown in FIG. 1 through the baseband processor interface 178, through the baseband processor 22, and through the antennas 28 or the network interface 30. In the embodiment shown, the program memory 172 is a known computer-readable memory, and generally includes codes for directing the microprocessor 170 to carry out various functions of the control system 20. The data memory 174 is also a known computer-readable memory generally for storing data related to the functions of the control system 20. The clock 176 stores a current time value, and in the embodiment shown is synchronized with corresponding clocks of the base stations 143, 144, 145, 147, 148, and 149. Although the control system 20 is illustrated in the embodiment shown as including the microprocessor 170, the program memory 172, the data memory 174, and the clock 176, one skilled in the art will appreciate that alternative embodiments may include different components or different combinations of components.

Mobile Station

With reference to FIG. 3, the mobile station 161 is illustrated, and the mobile stations 162, 163, 164, and 165 are substantially the same as the mobile station 161. Similarly to the base station 141, the mobile station 161 includes a control system 32, a baseband processor 34, transmit circuitry 36, receive circuitry 38, multiple receive antennas 40, and user interface circuitry 42. The receive circuitry 38 receives radio frequency signals bearing information from one or more of the base stations 141, 143, 144, 145, 147, 148, and 149 and the relay stations 15. A low noise amplifier and a filter (not shown) may cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 34 processes the digitized streams to extract information or data bits conveyed in the signal. This processing typically comprises demodulation, decoding, and error correction operations. The baseband processor 34 is generally implemented in one or more digital signal processors (DSPs) and application specific integrated circuits (ASICs).

For transmission, the baseband processor 34 receives digitized data, which may represent voice, video, data, or control information, from the control system 32, which it encodes for transmission. The encoded data is output to the transmit circuitry 36, where it is used by a modulator to modulate one or more carrier signals at a desired transmit frequency or frequencies. A power amplifier (not shown) amplifies the modulated carrier signals to a level appropriate for transmission, and delivers the modulated carrier signal to the receive antennas 40 through a matching network (not shown). Various modulation and processing techniques available to those skilled in the art may be used for signal transmission between the mobile stations 161, 162, 163, 164, and 165 and the base stations 141, 143, 144, 145, 147, 148, and 149, either directly or via the relay stations 15. The antennas 40 thus function as an interface for facilitating radio communication with one or more of the base stations 141, 143, 144, 145, 147, 148, and 149.

Figure 15:
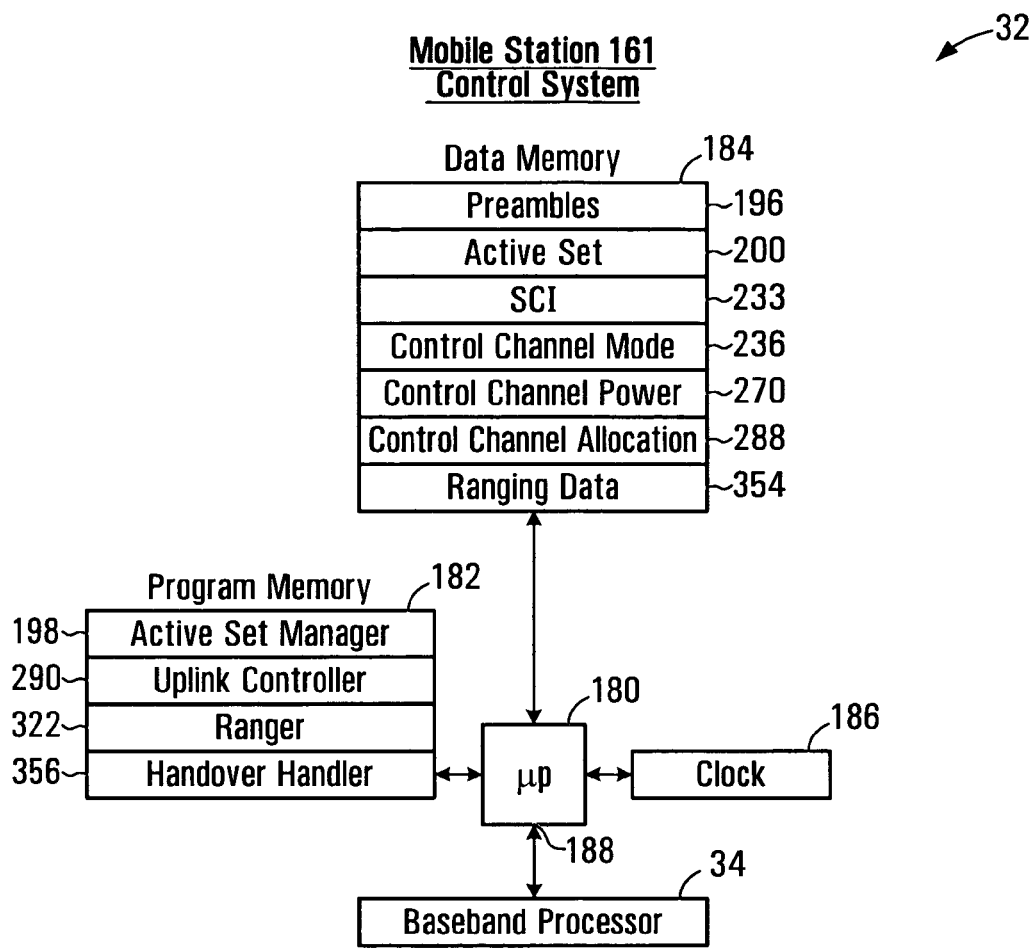
FIG. 15 is a schematic representation of an example control system of the mobile station of FIG. 3.

Referring to FIG. 15, the control system 32 is illustrated schematically. The control system 32 includes a microprocessor 180, and includes a program memory 182, a data memory 184, and a clock 186 all in communication with the microprocessor 180. The microprocessor 180 also includes a baseband processor interface port 188 for communicating with the baseband processor 34 (shown in FIG. 3). Therefore, in the embodiment shown, the control system 32 communicates with the base stations shown in FIG. 1 through the baseband processor interface 188, through the baseband processor 34, and through the antennas 40. In the embodiment shown, the program memory 182 is a known computer-readable memory, and generally stores codes for directing the microprocessor 180 to carry out various functions of the control system 32. The data memory 184 is also a known computer-readable memory generally for storing data related to the functions of the control system 32. The clock 186 stores a value representing a current time, and in the embodiment shown is synchronized with corresponding clocks of the mobile stations 162, 163, 164, and 165, with the clock 176 (shown in FIG. 14) of the base station 141, and with corresponding clocks of the base stations 143, 144, 145, 147, 148, and 149. Although the control system 32 is illustrated in the embodiment shown as including the microprocessor 180, the program memory 182, the data memory 184, and the clock 186, one skilled in the art will appreciate that alternative embodiments may include different components or different combinations of components.

OFDM Modulation

In OFDM modulation, the transmission band is divided into multiple, orthogonal carrier waves. Each carrier wave is modulated according to the digital data to be transmitted. Because OFDM divides the transmission band into multiple carriers, the bandwidth per carrier decreases and the modulation time per carrier increases. Since the multiple carriers are transmitted in parallel, the transmission rate for the digital data, or symbols, on any given carrier is lower than when a single carrier is used.

OFDM modulation includes the use of an Inverse Fast Fourier Transform (IFFT) on the information to be transmitted. For demodulation, a Fast Fourier Transform (FFT) is performed on the received signal to recover the transmitted information. In'practice, the IFFT and FFT are provided by digital signal processing involving an Inverse Discrete Fourier Transform (IDFT) and Discrete Fourier Transform (DFT), respectively. Accordingly, a characterizing feature of OFDM modulation is that orthogonal carrier waves are generated for multiple bands within a transmission channel. The modulated signals are digital signals having a relatively low transmission rate and capable of staying within their respective bands. The individual carrier waves are not modulated directly by the digital signals. Instead, all carrier waves are modulated at once by IFFT processing.

In operation, OFDM is preferably used for at least downlink transmission from the base stations 141, 143, 144, 145, 147, 148, and 149 to the mobile stations 161, 162, 163, 164, and 165. Each of the base stations 141, 143, 144, 145, 147, 148, and 149 is equipped with "n" of the transmit antennas 28 (n>=1), and each of the mobile stations 161, 162, 163, 164, and 165 is equipped with "m" of the receive antennas 40 (m>=1). Notably, the respective antennas can be used for reception and transmission using appropriate duplexers or switches and are so labeled only for clarity.

When the relay stations 15 are used, OFDM is preferably used for downlink transmission from the base stations 141, 143, 144, 145, 147, 148, and 149 to the relay stations and from the relay stations to the mobile stations 161, 162, 163, 164, and 165.

Relay Station

Figure 4:
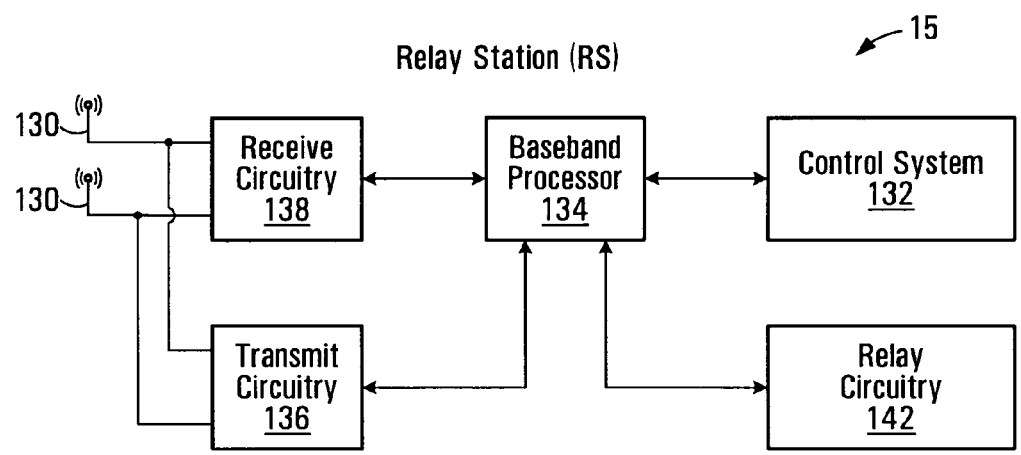
FIG. 4 is a block diagram of an example relay station shown in FIG. 1.

With reference to FIG. 4, an exemplary relay station 15 is illustrated. Similarly to the base station 141, and the mobile station 161, the relay station 15 includes a control system 132, a baseband processor 134, transmit circuitry 136, receive circuitry 138, multiple antennas 130, and relay circuitry 142. The relay circuitry 142 enables the relay station 15 to assist in communications between one of the base stations 141, 143, 144, 145, 147, 148, and 149 and one of the mobile stations 161, 162, 163, 164, and 165. The receive circuitry 138 receives radio frequency signals bearing information from one or more of the base stations 141, 143, 144, 145, 147, 148, and 149 and the mobile stations 161, 162, 163, 164, and 165. A low noise amplifier and a filter (not shown) may cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 134 processes the digital streams to extract information or data bits conveyed in the signal. This processing typically comprises demodulation, decoding, and error correction operations. The baseband processor 134 is generally implemented in one or more digital signal processors (DSPs) and application specific integrated circuits (ASICs).

For transmission, the baseband processor 134 receives digitized data, which may represent voice, video, data, or control information, from the control system 132, which it encodes for transmission. The encoded data is output to the transmit circuitry 136, where it is used by a modulator to modulate one or more carrier signals at a desired transmit frequency or frequencies. A power amplifier (not shown) will amplify the modulated carrier signals to a level appropriate for transmission, and deliver the modulated carrier signal to the antennas 130 through a matching network (not shown). Various modulation and processing techniques available to those skilled in the art may be used for signal transmission between the mobile stations 161, 162, 163, 164, and 165 and the base stations 141, 143, 144, 145, 147, 148, and 149, either directly or indirectly via the relay stations 15, as described above.

OFDM Transmissions

Figure 5:
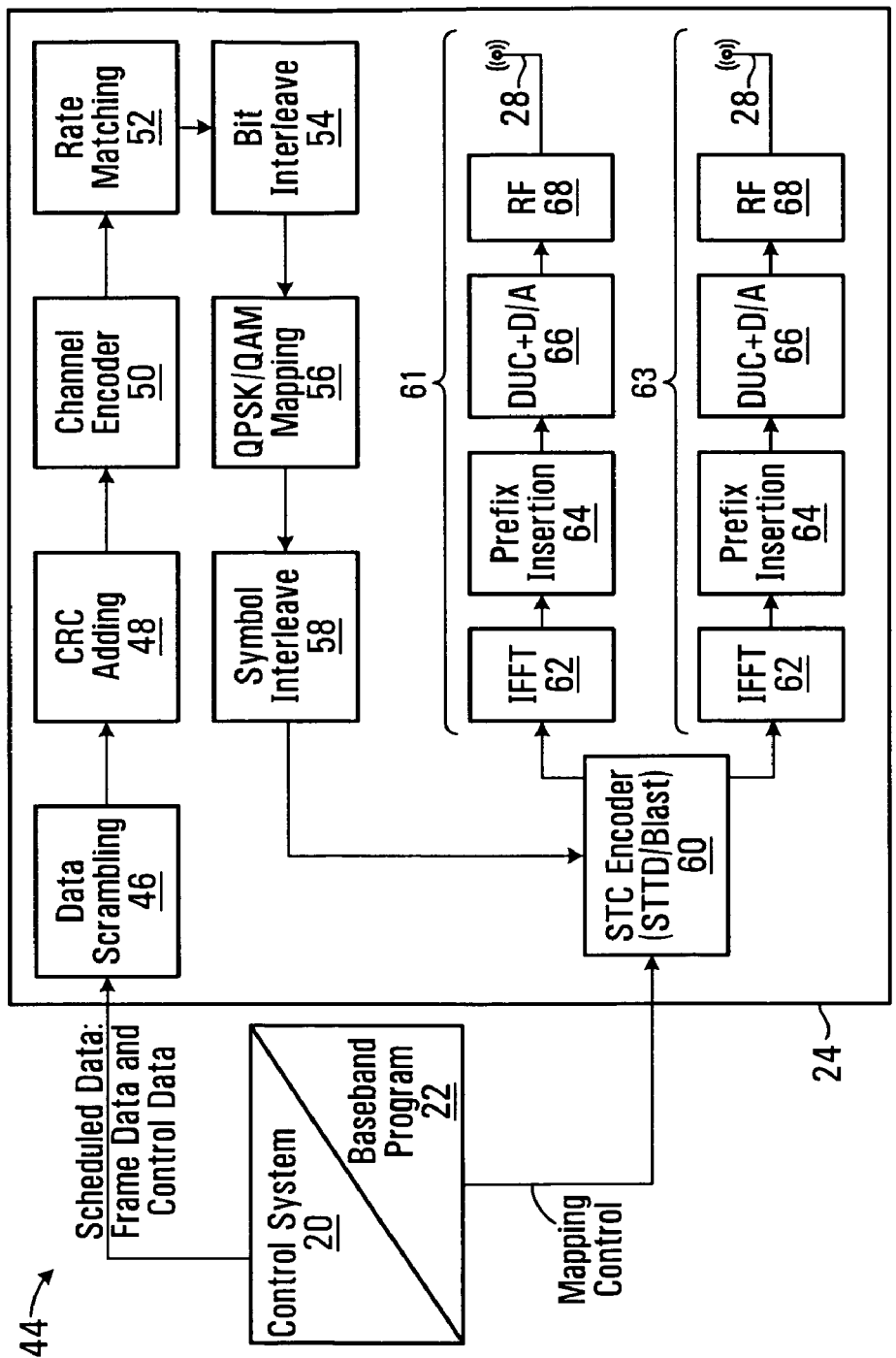
FIG. 5 is a block diagram of a logical breakdown of an example OFDM transmitter of the base station of FIG. 2.

With reference to FIG. 5, a logical OFDM transmission architecture will be described. Referring to FIG. 1, initially, the base station controller 10 will send data to be transmitted to various ones of the mobile stations 161, 162, 163, 164, and 165 to the base stations 141, 143, 144, 145, 147, 148, and 149, either directly or with the assistance of one of the relay stations 15. The base stations 141, 143, 144, 145, 147, 148, and 149 may use channel quality indicators (CQIs) associated with the mobile stations 161, 162, 163, 164, and 165 to schedule the data for transmission and to select appropriate coding and modulation for transmitting the scheduled data. The CQIs may be provided directly by the mobile stations 161, 162, 163, 164, and 165 or may be determined by the base stations 141, 143, 144, 145, 147, 148, and 149 based on information provided by the mobile stations. In either case, the CQI for each of the mobile stations 161, 162, 163, 164, and 165 is a function of the degree to which the channel amplitude (or response) varies across the OFDM frequency band.

Transmitting Scheduled Data to Mobile Station

Referring to FIGS. 1 and 5, the scheduled data 44 is a stream of bits and this stream is scrambled in a manner reducing the peak-to-average power ratio associated with the data using data scrambling logic 46. A cyclic redundancy check (CRC) for the scrambled data is determined and appended to the scrambled data using CRC adding logic 48. Next, channel coding is performed using a channel encoder 50 to effectively add redundancy to the data to facilitate recovery and error correction at the mobile stations 161, 162, 163, 164, and 165. The channel coding for a particular one of the mobile stations 161, 162, 163, 164, and 165 is based on the CQI associated with the particular mobile station. In some implementations, the channel encoder 50 uses known Turbo encoding techniques. The encoded data is then processed by rate matching logic 52 to compensate for data expansion associated with encoding.

Bit interleaver logic 54 systematically reorders the bits in the encoded data to minimize loss of consecutive data bits. The re-ordered data bits are systematically mapped into corresponding symbols depending on the chosen baseband modulation by mapping logic 56. Preferably, Quadrature Amplitude Modulation (QAM) or Quadrature Phase Shift Key (QPSK) modulation is used. The degree of modulation is preferably chosen based on the CQI associated with the particular mobile station. The symbols may be systematically reordered using symbol interleaver logic 58 to further bolster the immunity of the transmitted signal to periodic data loss caused by frequency selective fading.

At this point, groups of bits have been mapped into symbols representing locations in an amplitude and phase constellation. When spatial diversity is desired, blocks of symbols are then processed by space-time block code (STC) encoder logic 60, which modifies the symbols in a fashion making the transmitted signals more resistant to interference and more readily decoded at the mobile stations 161, 162, 163, 164, and 165. The STC encoder logic 60 will process the incoming symbols and provide "n" outputs corresponding to the number of the transmit antennas 28 for the base stations 141, 143, 144, 145, 147, 148, and 149. The control system 20 and/or the baseband processor 22 as described above with respect to FIG. 5 will provide a mapping control signal to control the STC encoder. At this point, assume the symbols for the "n" outputs are representative of the data to be transmitted and capable of being recovered by the mobile stations 161, 162, 163, 164, and 165.

For the present example, assume the base station (141 in FIG. 1) has two of the transmit antennas 28 (n=2) and the STC encoder logic 60 provides two output streams of symbols. Each of the output streams of symbols is sent to a corresponding output path 61, 63, illustrated separately for ease of understanding. Those skilled in the art will recognize that one or more processors may be used to provide such digital signal processing, alone or in combination with other processing described herein. In each output path an IFFT processor 62 will operate on symbols provided to it to perform an inverse Fourier Transform. The output of the IFFT processor 62 provides symbols in the time domain. The time domain symbols also known as OFDM symbols are grouped into frames, by assigning a prefix by prefix insertion function 64. The resultant frame is up-converted in the digital domain to an intermediate frequency and converted to an analog signal via respective digital up-conversion (DUC) and digital-to-analog (D/A) conversion circuitry 66. The resultant (analog) signals from each output path are then simultaneously modulated at the desired RF frequency, amplified, and transmitted via RF circuitry 68 and the transmit antennas 28 to one of the mobile stations 161, 162, 163, 164, and 165. Notably, pilot signals known by the intended one of the mobile stations 161, 162, 163, 164, and 165 are scattered among the sub-carriers. The mobile stations 161, 162, 163, 164, and 165, which are discussed in detail below, will use the pilot signals for channel estimation.

Reception of Signals at the Mobile Station

Figure 6:
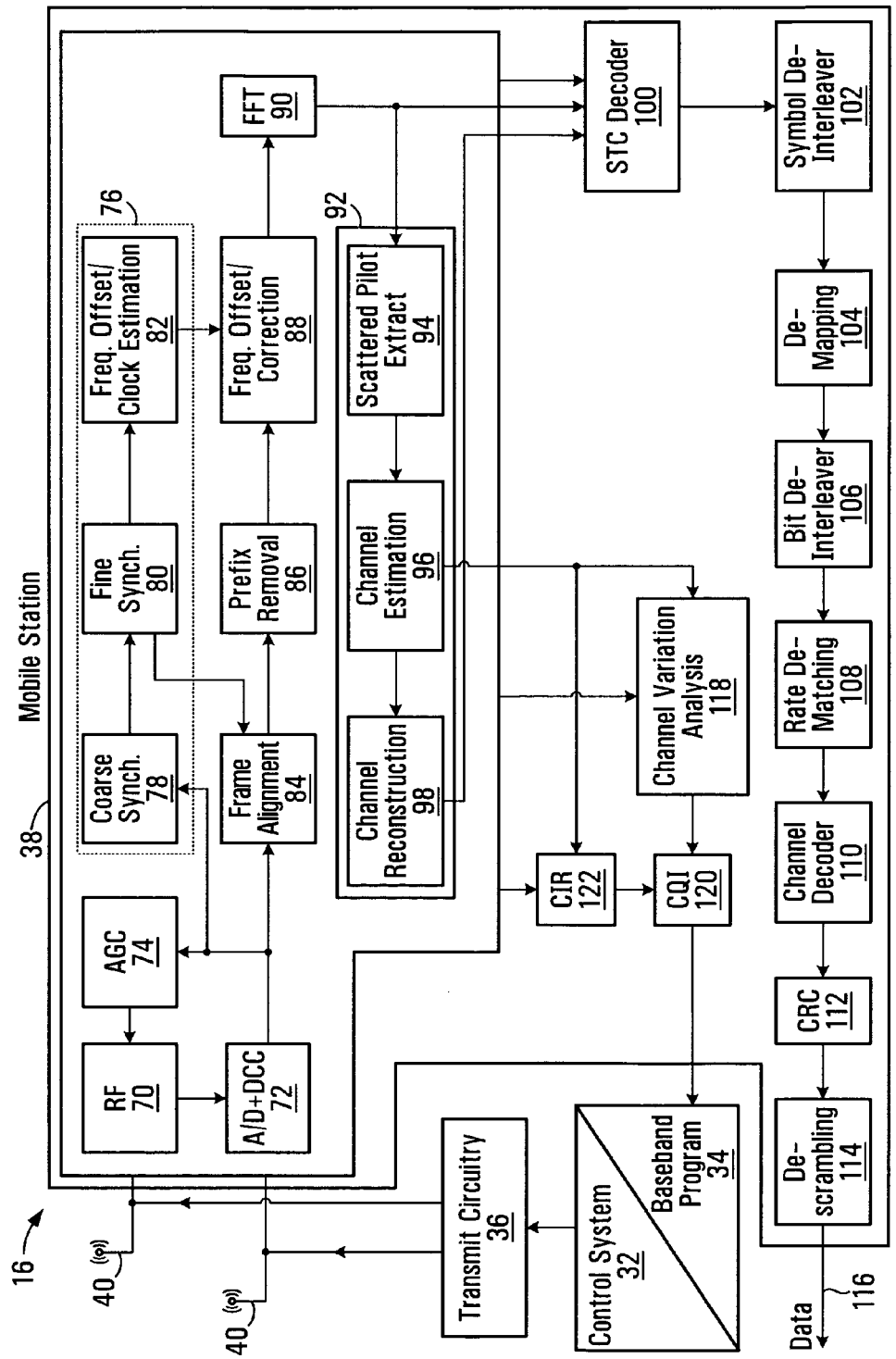
FIG. 6 is a block diagram of a logical breakdown of an example OFDM receiver of the wireless terminal of FIG. 3.
Figure 7:
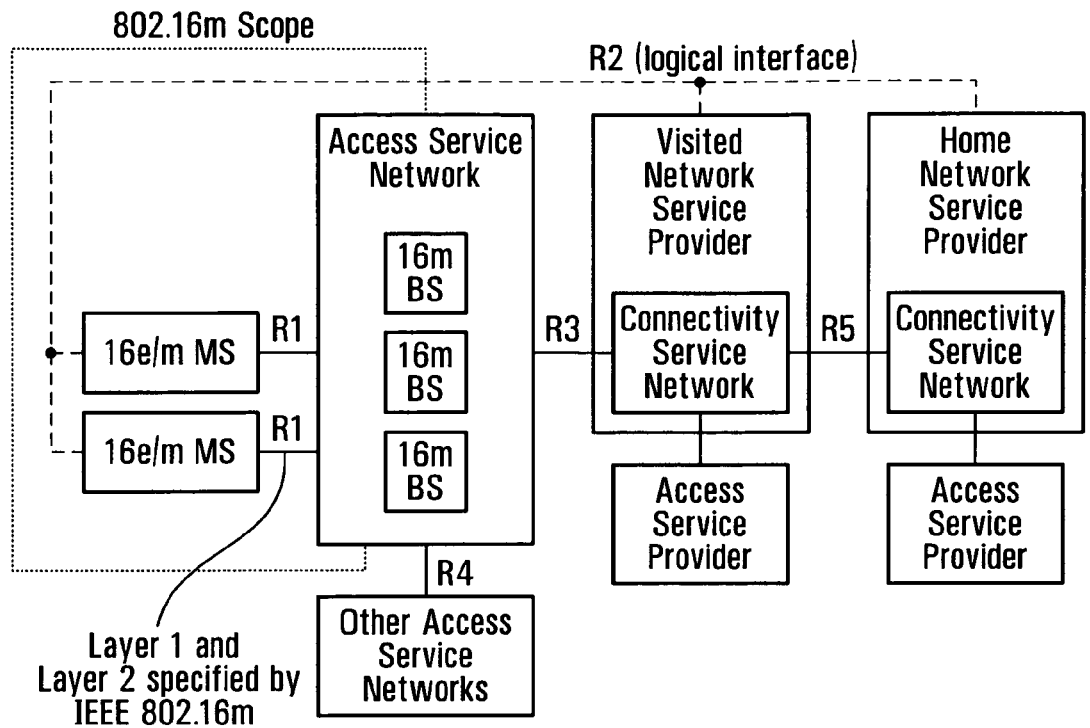
FIG. 7 is a schematic diagram of a network architecture implemented by the cellular communication system of FIG. 1 and corresponds to FIG. 1 of IEEE 802.16m-08/003r1.
Figure 8:
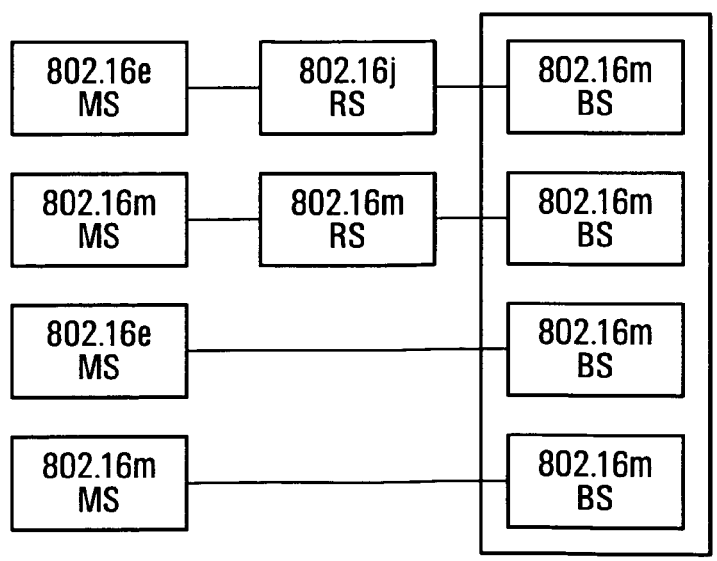
FIG. 8 is a schematic diagram of an architecture of the relay station of FIG. 4 and corresponds to FIG. 2 of IEEE 802.16m-08/003r1.
Figure 9:
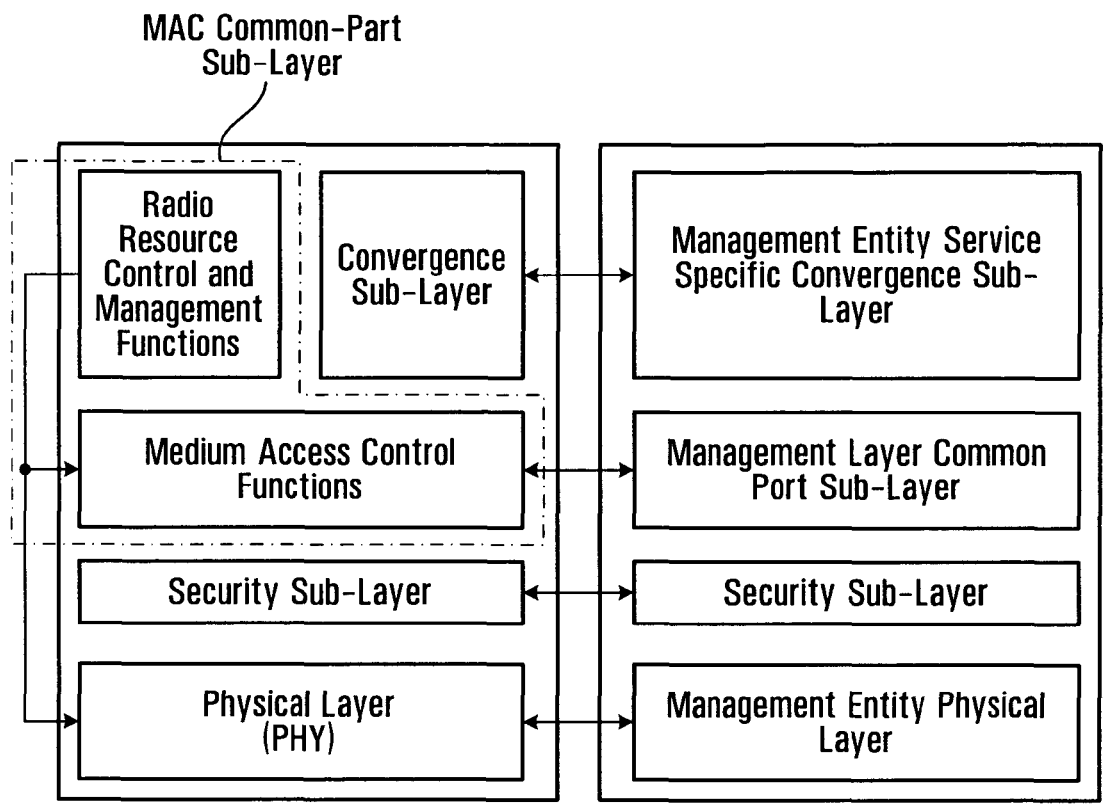
FIG. 9 is a schematic representation of a system reference model of the cellular communication system of FIG. 1 and corresponds to FIG. 3 of IEEE 802.16m-08/003r1.
Figure 10:
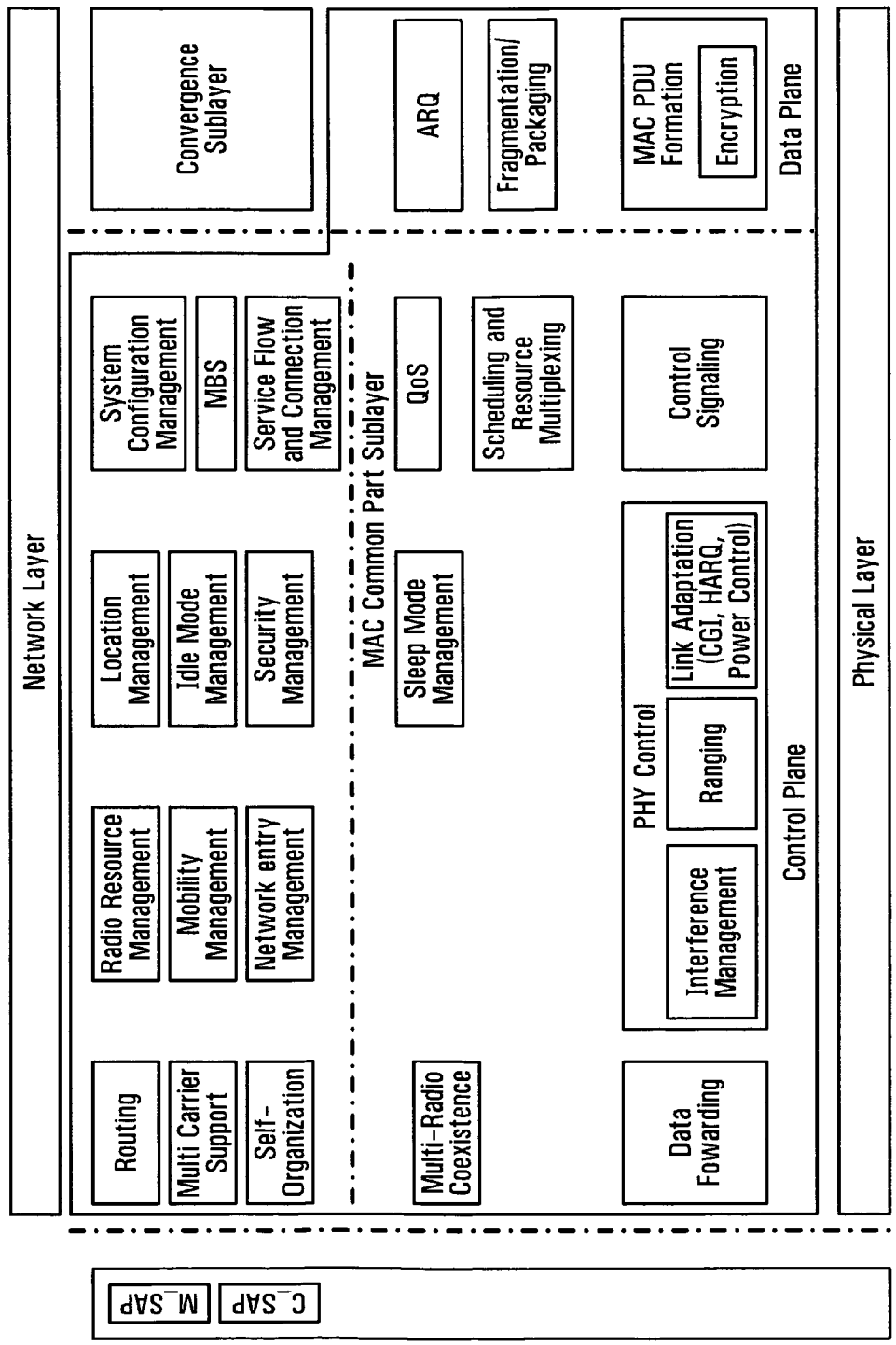
FIG. 10 is a schematic representation of a Protocol Structure in accordance with IEEE 802.16m and corresponds to FIG. 4 of IEEE 802.16m-08/003r1.
Figure 11:
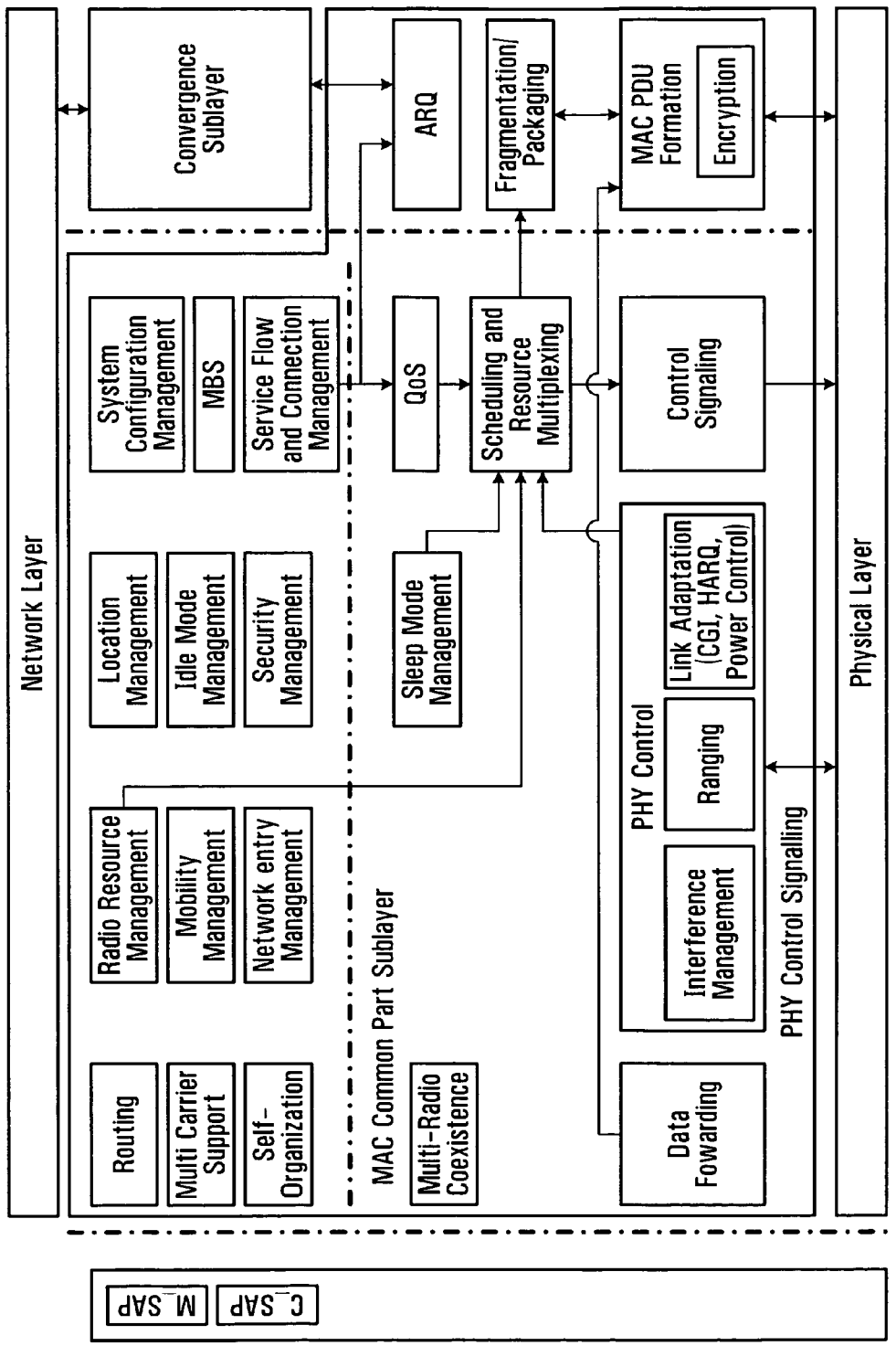
FIG. 11 is a processing flow diagram of a MS/BS Data Plane in accordance with IEEE 802.16m and corresponds to FIG. 5 of IEEE 802.16m-08/003r1.
Figure 12:
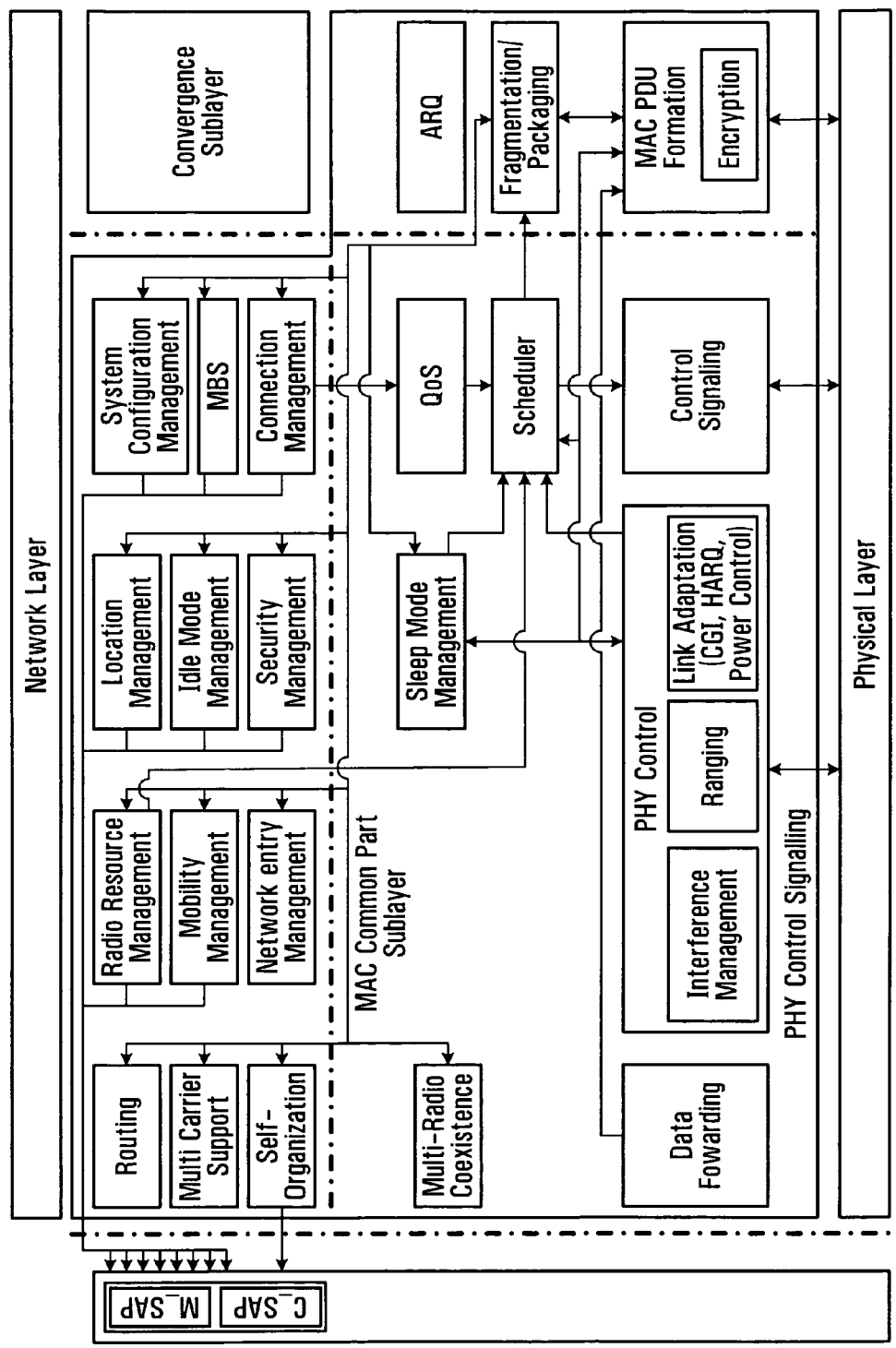
FIG. 12 is a processing flow diagram of the MS/BS Control Plane in accordance with IEEE 802.16m and corresponds to FIG. 6 of IEEE 802.16m-08/003r1.
Figure 13:
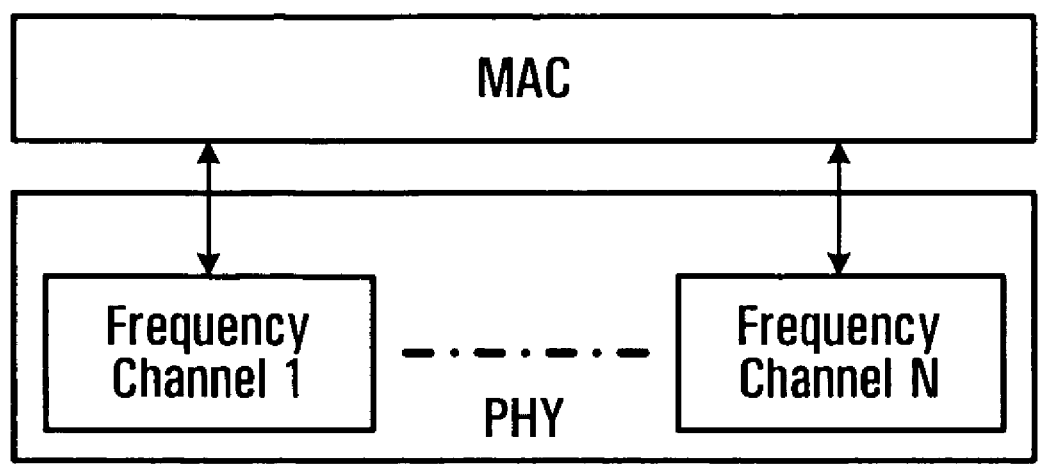
FIG. 13 is a schematic representation of a protocol architecture to support a multicarrier system and corresponds to FIG. 7 of IEEE 802.16m-08/003r1.

Reference is now made to FIG. 6 to illustrate reception of the transmitted signals by the mobile station 161, either directly from one of the base stations (such as the base station 141 in FIG. 1, for example) or with the assistance of one of the relay stations (15 in FIG. 1). Upon arrival of the transmitted signals at each of the receive antennas 40 of one of the mobile stations 161, 162, 163, 164, and 165, the respective signals are demodulated and amplified by corresponding RF circuitry 70. For the sake of conciseness and clarity, only one of the two receive paths is described and illustrated in detail. Analog-to-digital (A/D) converter and down-conversion circuitry 72 digitizes and downconverts the analog signal for digital processing. The resultant digitized signal may be used by automatic gain control circuitry (AGC) 74 to control the gain of amplifiers in the RF circuitry 70 based on the received signal level.

Initially, the digitized signal is provided to synchronization logic shown generally at 76, which includes coarse synchronization function 78, which buffers several OFDM symbols and calculates an auto-correlation between the two successive OFDM symbols. A resultant time index corresponding to the maximum of the correlation result determines a fine synchronization search window, which is used by fine synchronization function 80 to determine a precise framing starting position based on the headers. The output of the fine synchronization function 80 facilitates frame acquisition by frame alignment logic 84. Proper framing alignment is important so that subsequent FFT processing provides an accurate conversion from the time domain to the frequency domain. The fine synchronization algorithm is based on the correlation between the received pilot signals carried by the headers and a local copy of the known pilot data. Once frame alignment acquisition occurs, the prefix of the OFDM symbol is removed with prefix removal logic 86 and resultant samples are sent to a frequency offset/correction function 88, which compensates for the system frequency offset caused by the unmatched local oscillators in a transmitter and a receiver. Preferably, the synchronization logic 76 includes a frequency offset and clock estimation function 82, which uses the headers to help estimate frequency offset and clock offset in the transmitted signal and provide those estimates to the frequency offset/correction function 88 to properly process OFDM symbols.

At this point, the OFDM symbols in the time domain are ready for conversion to the frequency domain by an FFT processing function 90. The result is a set of frequency domain symbols, which are sent to a processing function 92. The processing function 92 extracts the scattered pilot signal using a scattered pilot extraction function 94, determines a channel estimate based on the extracted pilot signal using a channel estimation function 96, and provides channel responses for all sub-carriers using a channel reconstruction function 98. In order to determine a channel response for each of the sub-carriers, the pilot signal is essentially multiple pilot symbols that are scattered among the data symbols throughout the OFDM sub-carriers in a known pattern in both time and frequency.

Continuing with FIG. 6, the processing logic compares the received pilot symbols with the pilot symbols that are expected in certain sub-carriers at certain times to determine a channel response for the sub-carriers in which pilot symbols were transmitted. The results are interpolated to estimate a channel response for most, if not all, of the remaining sub-carriers for which pilot symbols were not provided. The actual and interpolated channel responses are used to estimate an overall channel response, which includes the channel responses for most, if not all, of the sub-carriers in the OFDM channel.

The frequency domain symbols and channel reconstruction information, which are derived from the channel responses for each receive path are provided to an STC decoder 100, which provides STC decoding on both received paths to recover the transmitted symbols. The channel reconstruction information provides equalization information to the STC decoder 100 sufficient to remove the effects of the transmission channel when processing the respective frequency domain symbols.

The recovered symbols are placed back in order using symbol de-interleaver logic 102, which corresponds to the symbol interleaver logic 58 of the transmitter. The de-interleaved symbols are then demodulated or de-mapped to a corresponding bitstream using de-mapping logic 104. The bits are then de-interleaved using bit de-interleaver logic 106, which corresponds to the bit interleaver logic 54 of the transmitter architecture. The de-interleaved bits are then processed by rate de-matching logic 108 and presented to channel decoder logic 110 to recover the initially scrambled data and the CRC checksum. Accordingly, CRC logic 112 removes the CRC checksum, checks the scrambled data in traditional fashion, and provides it to the de-scrambling logic 114 for de-scrambling using the known base station de-scrambling code to re-produce the originally transmitted data as data 116.

Still referring to FIG. 6, in parallel with recovering the data 116, a CQI, or at least information sufficient to create a CQI at each of the base stations 141, 143, 144, 145, 147, 148, and 149, is determined and transmitted to each of the base stations. As noted above, the CQI may be a function of the carrier-to-interference ratio (CR), as well as the degree to which the channel response varies across the various sub-carriers in the OFDM frequency band. For this embodiment, the channel gain for each sub-carrier in the OFDM frequency band being used to transmit information is compared relative to one another to determine the degree to which the channel gain varies across the OFDM frequency band. Although numerous techniques are available to measure the degree of variation, one technique is to calculate the standard deviation of the channel gain for each sub-carrier throughout the OFDM frequency band being used to transmit data.

In some embodiments, the relay stations may operate in a time division manner using only one radio, or alternatively include multiple radios.

Active Sets

Referring back to FIG. 1, each of the base stations 141, 143, 144, 145, 147, 148, and 149 generally has a plurality of neighbor base stations, which are generally base stations having adjacent cells. Referring to FIG. 1 as an example, the base station 143 has neighbor base stations 141, 144, 145, 147, 148, and 149.

The mobile stations 161, 162, 163, 164, and 165 each define, from time to time, a respective active set of base stations and/or relay stations, and in the embodiment shown the respective active sets include one or more of the base stations 141, 143, 144, 145, 147, 148, and 149 and/or one or more of the relay stations 15 under the control of a respective base station. In the embodiment shown, each of these active sets includes an anchor base station, with which the mobile station is in communication as described above. Further, these active sets may include none, some, or all of the neighbor base stations of the anchor base station, and thus such an active set generally includes the anchor base station and a subset of the neighbor base stations of the anchor base station. For example, in the embodiment shown, the mobile station 161 may have an active set including only the base station 141, and the mobile station 162 may have an active set including the base stations 141 and 145. As another example, the neighbor base stations of the mobile station 163 could be the base stations 141, 143, and 145 and one or more relay stations 15, but due to signal propagation conditions or other circumstances, the mobile station 163 may only include the base stations 141 and 143 in its active set. In alternative embodiments, active sets may exclude the anchor base stations but include none, some, or all of the neighbor base stations of the anchor base station and/or one or more relay stations.

When one of the mobile stations 161, 162, 163, 164, and 165 enters one of the cells 121, 123, 124, 125, 127, 128, or 129, such as when the mobile station is powered on or enters the region defined by the cells 121, 123, 124, 125, 127, 128, and 129, for example, the mobile station initiates communication with one of the base stations 141, 143, 144, 145, 147, 148, and 149 that is within communication range of the mobile station, which base station is the initial anchor base station of the mobile station in the embodiment shown. At this time, the anchor base station transmits, to the mobile station, information including preamble indices of the neighbor base stations of the anchor base station, to permit the mobile station to identify each of the neighboring base stations and measure signal strengths thereof, for example.

In the embodiment shown, the anchor base station transmits preamble indices of each of its neighbor base stations to the mobile station using a preamble index message (190, as discussed below). Referring to FIG. 1 as an example, the base station 143 transmits preamble indices of its neighbor base stations 141, 144, 145, 147, 148, and 149 to the mobile station using the preamble index message (190).

Figure 16:
FIG. 16 is a schematic representation of an example preamble index message sent by the base station control system of FIG. 14.

Referring to FIG. 16, an exemplary preamble index message is shown generally at 190. The preamble index message 190 includes a base station identifier field 192 for storing an identifier of a base station, and a preamble index field 194 for storing a preamble index of the base station identified by the base station identifier field 192. In the embodiment shown, when the mobile station 161, 162, 163, 164, or 165 enters the network illustrated in FIG. 1, one of the base stations 141, 143, 144, 145, 147, 148, and 149 acting as an anchor base station transmits a preamble index message 190 for each of the base stations 141, 143, 144, 145, 147, 148, and 149 that is a neighbor to the anchor base station. More generally, the anchor base station in the embodiment shown transmits, to a mobile station that joins a network for the anchor base station, a preamble index message 190 for every base station neighboring the anchor base station. These messages may be in the same or different OFDM frames in accordance with the IEEE 802.16e Standard. In other embodiments, the preamble indices of various base stations may be combined into a single message.

Referring back to FIG. 15, the data memory 184 includes a preambles store 196 for storing preamble indexes and associated base station identifiers received in preamble index messages 190 (shown in FIG. 16), and the control system 32 stores, in the preambles store 196, preamble indices that the mobile station 161 receives in various preamble index messages (190) from time to time.

Still referring to FIG. 15, the program memory 182 includes codes for an active set manager 198 for determining which base stations identified by base station identifiers in the preambles store 196 to maintain in an active set of base stations for the mobile station 161, and to store a list of base station identifiers of the base stations in the active set in an active set store 200 in the data memory 184. Criteria applied by the active set manager 198 differ in various embodiments, but generally include one or more of base station signal condition, set members recommended by the anchor base station, services offered by a base station, and network operator of the base station, for example. As base stations in the active set of the mobile station 161 change from time to time, the mobile station 161 notifies the anchor base stations of the base stations in the active set by sending active set signals, including active set messages (202, as discussed below), to the anchor base station.

Figure 17:
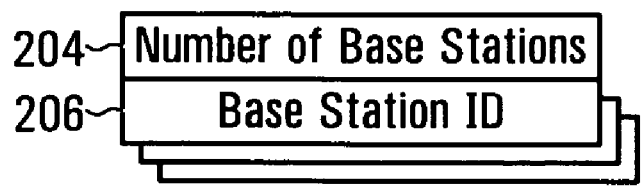
FIG. 17 is a schematic representation of an example active set message sent by the mobile station control system of FIG. 15.

Referring to FIG. 17, an example active set message is shown generally at 202. The active set message 202 includes a number of base stations field 204 for storing a number of base stations in an active set, and one or more base station identifier fields 206 in a number equal to the number stored in the number of base stations field 204. In the embodiment shown, the mobile station 161 transmits an active set message 202 to the anchor base station (such as the base station 141) when the base stations in the active set of the mobile station 161 change. In alternative embodiments, the mobile station 161 may transmit to the anchor base station a MOB_BSHO-RSP message (defined in the IEEE 802.16e Standard), using the diversity set fields in such a message, to communicate the active set to the anchor base station.

Referring back to FIG. 14, the data memory 174 includes an active set store 208 for storing lists of active sets of the various mobile stations 161, 162, 163, 164, and/or 165 for which the base station 141 acts as the anchor base station, and the control system 20 stores, in the active set store 208, lists of active sets that the base station 141 receives in various active set messages (202) from time to time.

System Configuration Information Distribution

Still Referring to FIG. 14, the data memory 174 includes a system configuration information (SCI) store 210 for storing system configuration information of the base station 141, and of the neighbor base stations of the base station 141, which neighbor base stations in the embodiment shown are the base stations 143, 145, and 147. Different types of system configuration information may be stored in various embodiments, but in the embodiment shown, the system configuration information stored in the system configuration information store 210 includes, for the base station 141 and for each neighbor base station 143, 145, and 147: an id entifier of the base station; a preamble index of the base station; uplink channel information of the base station; and downlink channel information of the base station. However, in alternative embodiments, the system configuration information of a base station may include one or more of the following: an identifier of the base station; an identifier of a preamble index of the base station; an identifier of a subchannel index of the base station; frequency assignment information for the base station; a time/frequency synchronization indicator associated with the base station; uplink channel information for the base station; downlink channel information for the base station; a trigger reference indicator associated with the base station; the equivalent isotropically radiated power of the base station; handover information for the base station; scheduling service information for the base station; supported mobility feature information for the base station; a paging group identifier associated with the base station; an identifier of channel bandwidth of the base station; an identifier of a cyclic prefix of the base station; an identifier of frame duration of the base station; an identifier of a fast-Fourier transform size of the base station; and an operation mode of the starting subchannelization of a frame and channel number of the base station.

Figure 18:
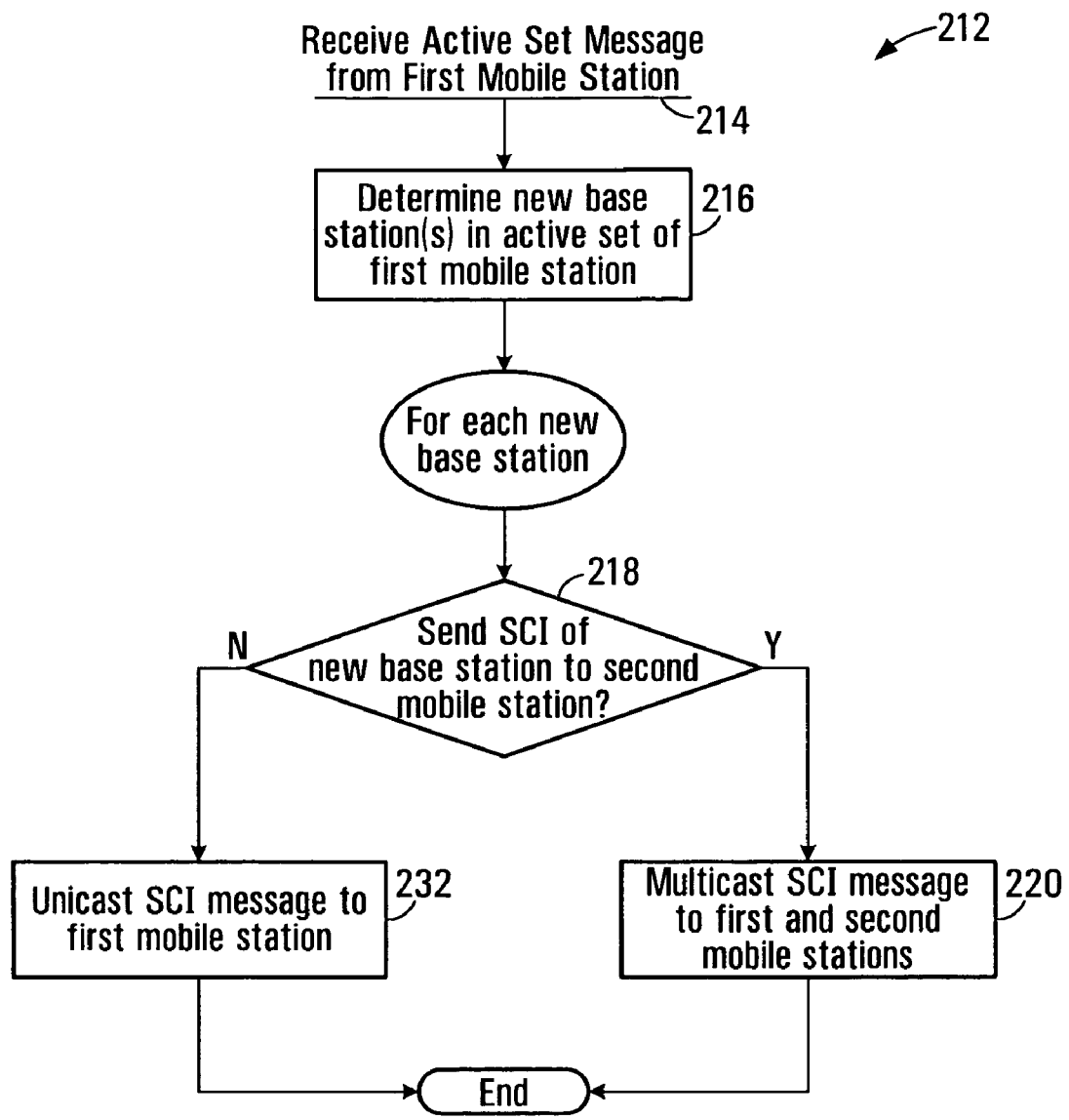
FIG. 18 is a block diagram of example system configuration information distribution codes executed by a microprocessor of the base station control system of FIG. 14.

Still referring to FIG. 14, the program memory 172 includes codes for a system configuration information distributor 212. Referring to FIG. 18, the system configuration information distributor 212 is illustrated schematically, and begins at 214 in response to receiving an active set message 202 (shown in FIG. 17) from one of the mobile stations 161, 162, 163, 164, and 165 (referred to below and in FIG. 18 as the "first mobile station").

The system configuration information distributor 212 continues at block 216, which directs the microprocessor 170 (shown in FIG. 14) to compare the base stations identified by the base station identifier fields 206 in the active set message 202 (shown in FIG. 17) received from the first mobile station to the active set list stored in the active set store 208 (shown in FIG. 14) for the first mobile station, and to determine what new base stations, if any, have been added to the active set of the first mobile station.

The system configuration information distributor 212 proceeds to block 218 for each new base station in the active set of the first mobile station as identified at block 216. Block 218 directs the microprocessor 170 (shown in FIG. 14) to determine whether the system configuration information of the new base station in the active set of the first mobile station should also be sent to one of the mobile stations 161, 162, 163, 164, and 165 other than the first mobile station (referred to below and in FIG. 18 as the "second mobile station"). By way of background, the system configuration information distributor 212 may be executed asynchronously, and therefore the base station 141 may receive respective active set messages 202 (shown in FIG. 17) from the first and second mobile stations, and those active set messages may include the same new base station in the respective sets of the first and second mobile stations. The microprocessor (shown in FIG. 14) may reach the codes at block 218 in response to the active set message (202) from the first mobile station before reaching block 218 in response to the active set message (202) from the second mobile station. In such a circumstance, at block 218, the microprocessor (170) determines that the system configuration information of the new base station may be sent both to the first and second mobile stations. In that case, the system configuration information distributor 212 continues at block 220, which directs the microprocessor (170) to multicast, in response to receiving the active set messages (202) from the first and second mobile stations, a system configuration signal including a system configuration message (222, as discussed below) to the first and second mobile stations. The system configuration information distributor 212 then ends.

Figure 19:
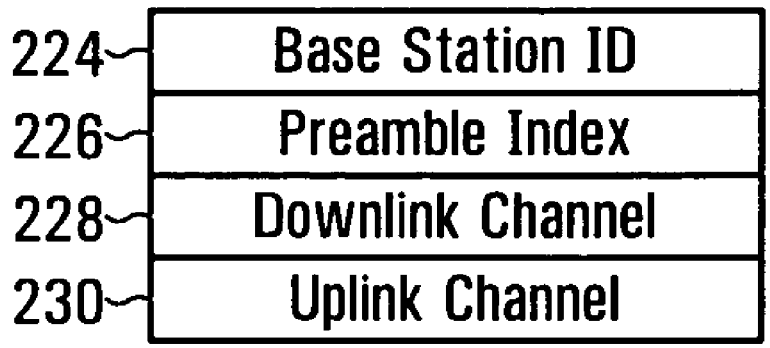
FIG. 19 is a schematic representation of an example system control information message sent by the base station control system of FIG. 14.

Referring to FIG. 19, an exemplary system configuration information message is shown generally at 222, and generally includes the system configuration information stored in the system configuration information store 210 (shown in FIG. 14) for the new base station in the active set of the mobile station. In the embodiment shown, the system configuration information message includes a base station identifier field 224, a preamble index field 226, a downlink channel field 228, and an uplink channel field 230. However, in various embodiments, the system configuration information message 222 may include different information, and in some embodiments may include the information distributed in a MOB_NBR-ADV message as defined in the IEEE 802.16e Standard, for example.

Referring back to FIG. 18, if at block 218 the microprocessor (170) determines that the system configuration information of the new base station need not be sent to any second mobile station, then the system configuration information distributor 212 continues at block 232, which directs the microprocessor (170) to transmit, to the first mobile station, a system configuration information signal including a system configuration information message 222 (shown in FIG. 19) to the first mobile station. The system configuration information distributor 212 then ends.

Referring back to FIG. 15, the data memory 184 includes a system configuration information store 233 for storing system configuration information received from system configuration information messages 222 (shown in FIG. 19), and the control system 32 stores, in the system configuration information store 233, system configuration information that the mobile station 161 receives in various system configuration information messages (222) from time to time.

In general, the system configuration information distributor 212 only transmits, to a mobile station, system configuration information of a base station when the base station is added to an active set of the mobile station, and this method of distributing system configuration information of a base station may be more efficient than other protocols for distributing system configuration information.

Control Channels

In OFDM modulation and other modulation techniques, a control channel may be established for transmitting control messages between mobile stations (such as the mobile stations 161, 162, 163, 164, and 165, shown in FIG. 1, for example) and base stations (such as the base stations 141, 143, 144, 145, 147, 148, and 149 shown in FIG. 1, for example). Examples of such control messages include the preamble index message 190 (shown in FIG. 16), the active set message 202 (shown in FIG. 17), and the system configuration information message 222 (shown in FIG. 19). Other examples of such control messages include MAC messages defined in the IEEE 802.16e Standard.

Referring back to FIGS. 14 and 15, the base station 141 and the mobile station 161 in the embodiment shown can operate either in a single control channel mode or a multiple control channel mode. Accordingly, the data memory 174 includes a control channel mode store 234 for storing an indicator of whether the base station 141 is in the single control channel mode or in the multiple control channel mode, and the data memory 184 includes a control channel mode store 236 for storing an indicator of whether the mobile station 161 is in the single control channel mode or in the multiple control channel mode. The control channel mode stores 234 and 236 may be pre-configured, or may be configured from time to time to change the control channel modes of the base station 141 and the mobile station 161.

Referring back to FIG. 14, the program memory 172 includes codes for a power controller 238. The power controller 238 in the embodiment shown may be executed in respect of one of the mobile stations 161, 162, 163, 164, and 165 for which the base station 141 is the anchor base station. When the base station 141, and the mobile station in respect of which the power controller 238 is executed, are in the single control channel mode, the power controller 238 controls a power level of that mobile station over the uplink control channel.

Figure 20:
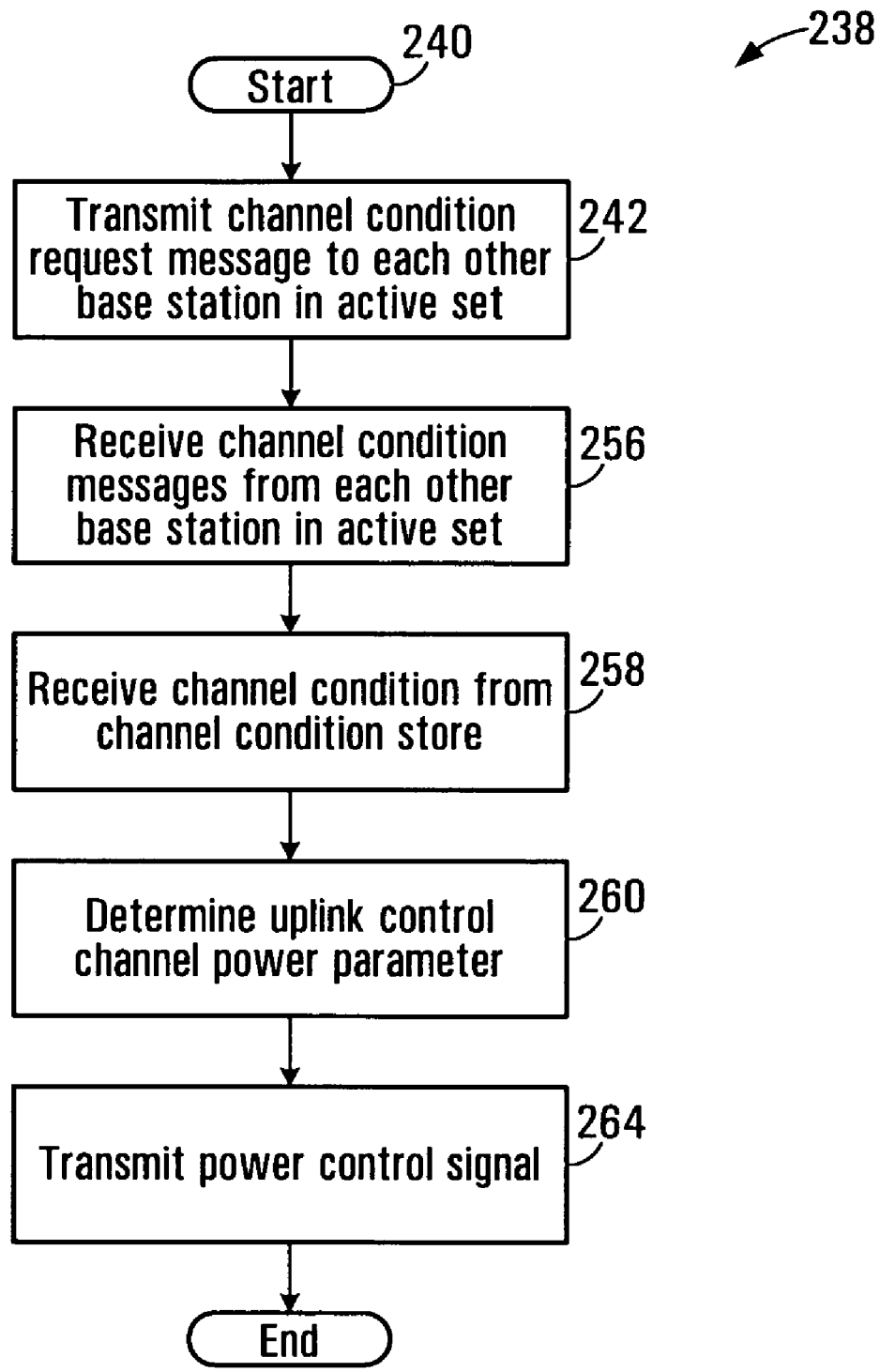
FIG. 20 is a block diagram of example power control codes executed by the microprocessor of FIG. 14.

Referring to FIG. 20, the codes of the power controller 238 are illustrated schematically, and begin at 240. The power controller 238 may be executed periodically, or may be executed in response to encountering a problem with a power level used by a mobile station on the uplink control channel, such as signal interference or poor reception of control messages, for example.

The power controller 238 continues at block 242, which directs the microprocessor 170 (shown in FIG. 14) to retrieve, from the active set store 208 (shown in FIG. 14), identifiers of the base stations in the active set of the mobile station in respect of which the power controller 238 is executed, and to transmit a channel condition request message (244, as discussed below) to each base station in the active set of the mobile station in respect of which the power controller 238 is executed.

Figure 21:
FIG. 21 is a schematic representation of an example channel condition request message sent by the base station control system of FIG. 14.

Referring to FIG. 21, an exemplary channel condition request message is shown generally at 244, and includes a mobile station identifier field 246 identifying the mobile station in respect of which the power controller 238 is executed.

Referring back to FIG. 14, the data memory 174 includes a channel condition store 248 for storing condition values representing channel conditions of control signals received by the base station 141 from various ones of the mobile stations 161, 162, 163, 164, and 165. The base station 141 periodically updates values in the channel condition store 248 to maintain periodically updated channel condition values reflecting, in the embodiment shown, signal-to-noise ratios for various ones of the mobile stations 161, 162, 163, 164, and 165 as measured at the base station 141 from time to time.

When one of the base stations 141, 143, 144, 145, 147, 148, and 149 receives a condition request message 244 (shown in FIG. 21) from another one of the base stations 141, 143, 144, 145, 147, 148, and 149, the base station that received the condition request message (244) returns, to the base station that sent the condition request message (244), a channel condition signal including a channel condition message (250, as discussed below).

Figure 22:
FIG. 22 is a schematic representation of an example channel condition message sent by the base station control system of FIG. 14.

Referring to FIG. 22, an exemplary channel condition message is shown generally at 250. The channel condition message 250 includes a mobile station identifier field 252, which includes the mobile station identifier from the mobile station identifier field 246 of the channel condition request message 244 (shown in FIG. 21) that the channel condition message 250 is responding to. The channel condition message 250 also includes a signal-to-noise ratio field 254 for storing a signal-to-noise ratio value of the mobile station identified by the mobile station identifier field 252 from the channel condition store 248 (shown in FIG. 14).

Referring back to FIG. 20, the power controller 238 continues at block 256, which directs the microprocessor 170 (shown in FIG. 14) to receive the channel condition messages 250 (shown in FIG. 22) from each base station, other than the base station executing the power controller 238, in the active set of the mobile station in respect of which the power controller 238 is executed.

The power controller 238 continues at block 258, which directs the microprocessor 170 (shown in FIG. 14) to receive the channel condition of the mobile station in respect of which the power controller 238 is executed from the channel condition store 248 of the base station 141. Therefore, the codes at blocks 256 and 258 collectively cause the microprocessor (170) to receive channel condition signals from all of the base stations in the active set of the mobile station in respect of which the power controller 238 is executed.

The power controller 238 continues at block 260, which directs the microprocessor (170) to determine an uplink control channel power parameter for the mobile station in respect of which the power controller 238 is executed. In the embodiment shown, the data memory 174 includes a channel condition threshold store 262 (shown in FIG. 14) storing a threshold signal-to-noise ratio, which is a minimum preferable signal-to-noise ratio for receiving control signals from a mobile station. In the embodiment shown, the codes at block 260 direct the microprocessor (170) to determine a lowest one of the signal-to-noise ratio levels received at blocks 256 and 258 from the base stations in the active set in respect of which the power controller 238 is executed, and to calculate a ratio of: the threshold signal-to-noise ratio stored in the channel condition threshold store (262); and the lowest one of the signal-to-noise ratio levels received at blocks 256 and 258. Therefore, in the embodiment shown, the uplink control channel power parameter is a scaling factor that would be required of the power level at the mobile station in respect of which the power controller 238 is executed in order for control signals from that mobile station to be received at all of the base stations in the active set of that base station with a signal-to-noise ratio of at least the threshold signal-to-noise ratio stored in the channel condition threshold store 262.

Referring back to FIG. 20, the power controller 238 continues at block 264, which directs the microprocessor (170) to transmit, to the mobile station in respect of which the power controller 238 is executed, a power control signal including a power control message (266, as discussed below). The power controller 238 then ends.

Figure 23:
FIG. 23 is a schematic representation of an example power control message sent by the base station control system of FIG. 14.

Referring to FIG. 23, an exemplary power control message is illustrated generally at 266, and includes a power control parameter field 268 for storing the power control parameter determined at block 260 (shown in FIG. 20).

Referring back to FIG. 15, the data memory 184 includes a control channel power store 270 for storing a power level for transmitting control signals on the uplink control channel when the control channel mode of the mobile station 161 is the single channel mode. In response to receiving a power control message 266, the mobile station 161 in the embodiment shown adjusts the control channel power stored in the control channel power store 270 by multiplying the control channel power in the control channel power store 270 by the power control parameter in the power control parameter field 268 (shown in FIG. 23). Therefore, in the embodiment shown, if the power control parameter is greater than 1, then the control channel power in the control channel power store 270 is increased by the scaling factor represented in the power control parameter, and if the power control parameter is less than one, then the control channel power in the control channel power store 270 is decreased by the scaling factor represented in the power control parameter.

The power controller 238 causes transmission to a mobile station of a single parameter usable by the mobile station to facilitate reception of control messages sent by the mobile station at all of the base stations in the active set of the mobile station, advantageously reducing processing time at the mobile station or additional transmissions involving the mobile station that may be required in known protocols for power control.

Multiple Control Channel Mode

Referring back to FIG. 14, the program memory 172 includes codes for a control channel allocator 272. If the control channel mode store 234 indicates that the control channel mode is the multiple control channel mode, the microprocessor 170 executes the control channel allocator 272 to allocate, for one of the mobile stations 161, 162, 163, 164, or 165, a respective control channel for each base station in the active set of the mobile station.

Figure 24:
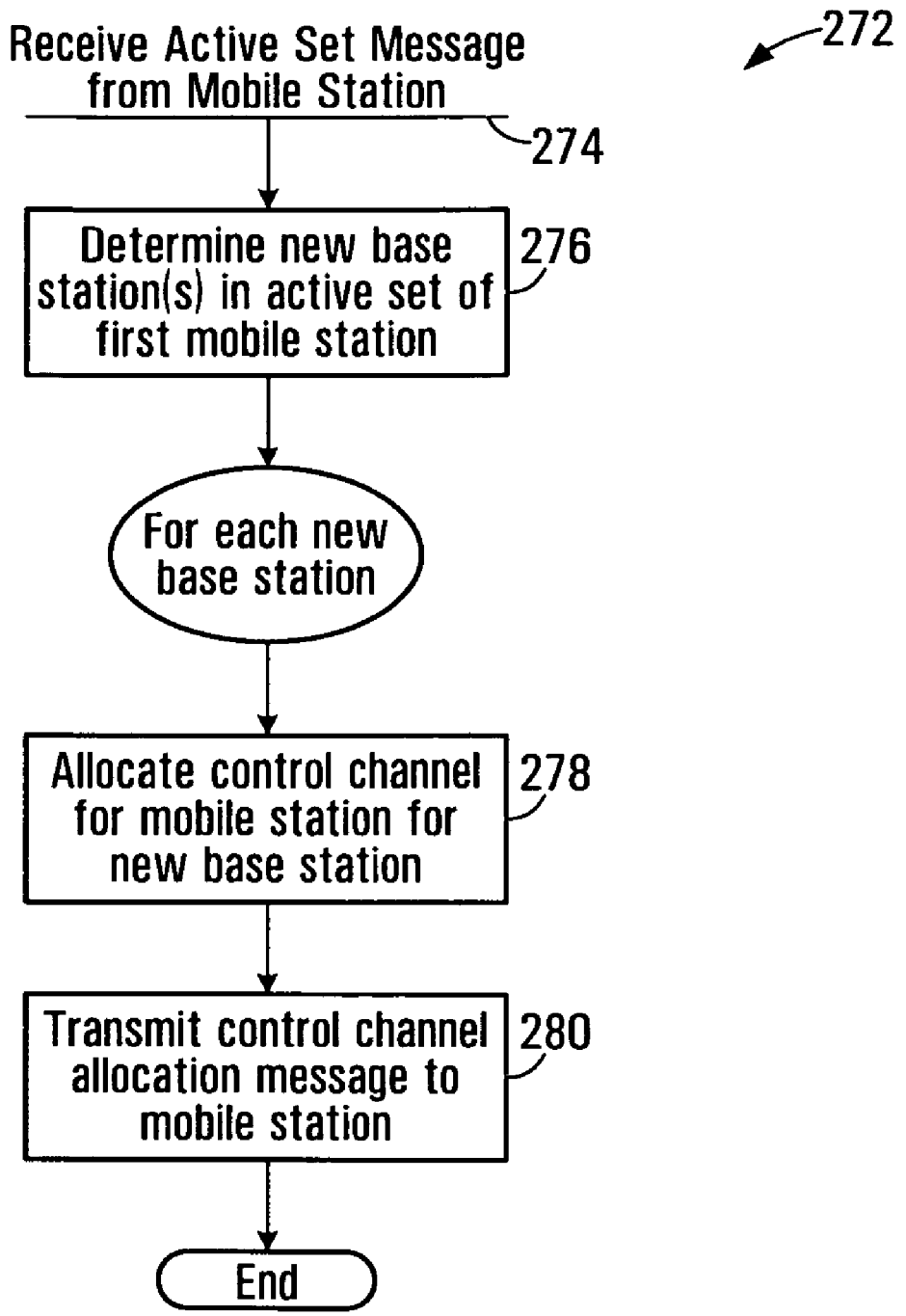
FIG. 24 is a block diagram of example control allocation codes executed by the microprocessor of FIG. 14.

Referring to FIG. 24, the control channel allocator 272 is illustrated schematically, and begins at 274, when the control channel mode store (234) indicates that the control channel mode is the multiple control channel mode, in response to receiving an active set message 202 (shown in FIG. 17) from a mobile station.

The control channel allocator 272 continues at block 276, which directs the microprocessor 170 (shown in FIG. 14) to determine what new base stations, if any, have been added to the active set of the mobile station that sent the active set message (202) received at 274, and therefore the codes at block 276 are substantially the same as the codes at block 216 shown in FIG. 18.

Still referring to FIG. 24, the control channel allocator 272 executes blocks 278 and 280 for each new base station identified at block 276. The codes at block 280 allocate a control channel from among a plurality of available control channels for the mobile station to transmit uplink control signals to the new base station in the active set of the mobile station, and the codes at block 280 cause the microprocessor (170) to transmit a control channel allocation message (282, as discussed below) to the mobile station.

Figure 25:
FIG. 25 is a schematic representation of an example control channel allocation message sent by the base station control system of FIG. 14.

Referring to FIG. 25, an exemplary control channel allocation message is shown generally at 282, and includes a base station identifier field 284 for storing an identifier of the new base station added to the active set of the mobile station, and a channel identifier field 286 for storing an identifier of a channel allocated to the mobile station for transmitting uplink control signals to the base station identified by the base station identifier in the base station identifier field 284.

Referring back to FIG. 24, once the control channel allocator 272 has executed the blocks 278 and 280 for each new base station identified at block 276, the control channel allocator 272 ends.

Referring back to FIG. 15, the data memory 184 includes a control channel allocation store 288 for storing control channel allocations as received in control allocation messages 282 (shown in FIG. 25), and the control system 32 stores, in control channel allocation store 288, control channel allocations as received in control allocation messages (282) from time to time.

Still referring to FIG. 15, the program memory 182 includes codes for an uplink controller 290 for controlling transmission of uplink control commands when the control mode store 236 indicates that the control channel mode is the multiple control channel mode.

Figure 26:
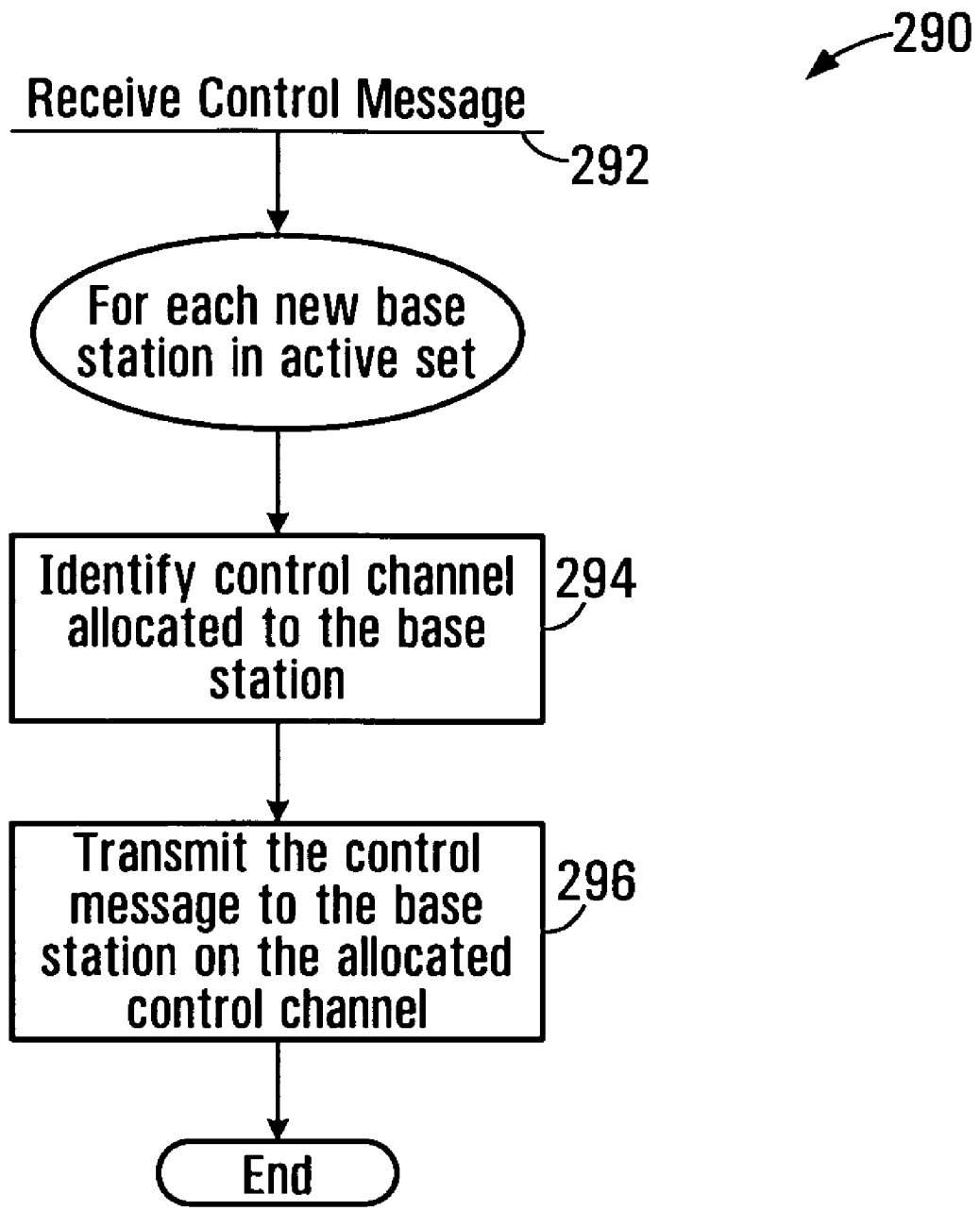
FIG. 26 is a block diagram of example uplink control codes executed by a microprocessor of FIG. 15.

Referring to FIG. 26, the uplink controller 290 is illustrated schematically, and begins at 292 in response to receiving a control message. The control message received at 292 may be any control message to be transmitted from the mobile station 161 to the base stations in the active set of the mobile station 161, such as conventional MAC messages, for example.

For each base station in the active set (as identified in the active set store 200 shown in FIG. 15), the uplink controller 290 executes the codes at blocks 294 and 296. The codes at block 294 direct the microprocessor 180 (shown in FIG. 15) to identify a control channel allocated to the base station as identified in the control channel allocation store 288. The codes at block 296 direct the microprocessor (180) to transmit the control message to the base station on the allocated control channel identified by the codes at block 294. The uplink controller 290 then ends.

Advantageously, the mobile station 161 may determine respective power levels for each of the control channels identified in the control channel allocation store 288, and these respective power levels may be adapted to particular circumstances such as distance, noise conditions, and other interference, for example, associated with each one of the base stations in the active set of the mobile station 161. Therefore, the various control channels identified in the control channel allocation store 288 facilitate sending control channels at respective power levels that may be identified for each of the base stations in an active set.

Ranging

Referring to FIG. 1, as indicated above, a mobile station 161, 162, 163, 164, or 165 may acquire data representing distances between the mobile station and one or more of the base stations 141, 143, 144, 145, 147, 148, and 149, in an active set of the mobile station. Because a mobile station is generally different distances from the base stations in the active set of the mobile station, uplink signals from the mobile station travel different distances before reaching the various base stations in the active set, and therefore arrive at the various base stations in the active set at different times. Such differences of time may cause interference, for example, as a signal from one mobile station may arrive at a base station earlier or later than intended, thereby interfering with a preceding or succeeding signal from another mobile station, for example.

Figure 27:
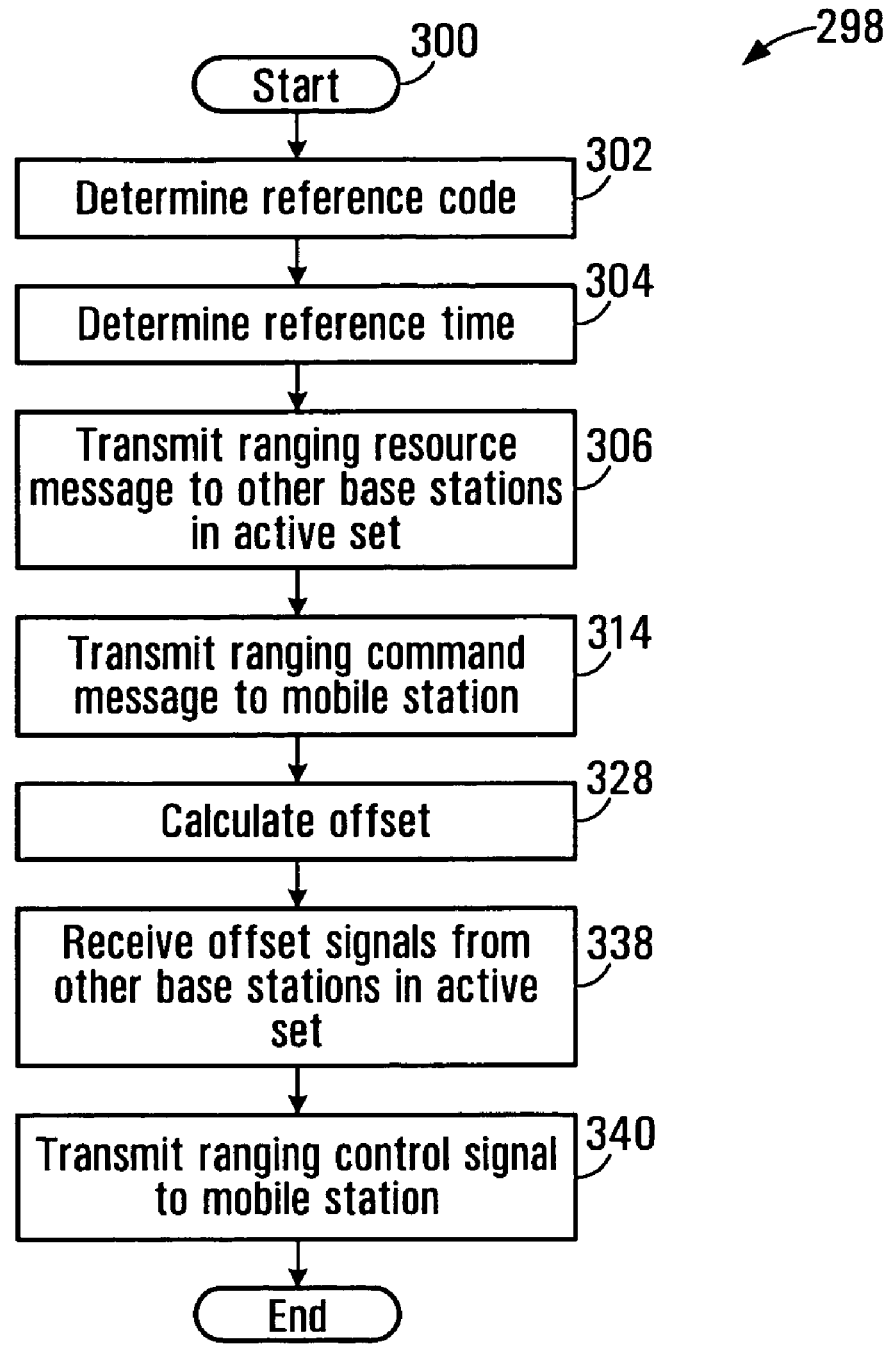
FIG. 27 is a block diagram of example ranging initiation codes executed by the microprocessor of FIG. 14.

Referring to FIG. 14, the program memory 172 includes codes for a ranging initiator 298 that may be executed in respect of a mobile station for which the base station 141 is the anchor base station. Referring to FIG. 27, the ranging initiator 298 is illustrated schematically, and begins at 300. The ranging initiator 298 may be executed periodically by the microprocessor 170 (shown in FIG. 14), or may be executed in response to an indication that a mobile station requires new or updated ranging information because the mobile station has added a new base station to its active set or because the mobile station has repeatedly caused interference with signals from other mobile stations, for example.

The ranging initiator 298 continues at block 302, which directs the microprocessor 170 (shown in FIG. 14) to determine a reference code (which may also be referred to as a "ranging code"). In the embodiment shown, the reference code generated at block 302 is a pseudo-random binary number, although in other embodiments, the reference code may be a predetermined code for each mobile station, for example.

The ranging initiator 298 continues at block 304, which directs the microprocessor (170) to determine a reference time for the mobile station to transmit a signal including the reference code determined at block 302. As discussed above with reference to FIGS. 14 and 15, the clocks 176 and 186 of the base station 141 and the mobile station 161 respectively, and the corresponding clocks of the base stations 143, 144, 145, 147, 148, and 149 and of the mobile stations 162, 163, 164, and 165, are synchronized in the embodiment shown, and these clocks define sequential frames in time for transmission of data. The codes at block 304 direct the microprocessor (170) to determine a reference time, which in the embodiment shown is a particular OFDM frame as determined by the aforementioned synchronized clocks.

Still referring to FIG. 27, the ranging initiator 298 continues at block 306, which directs the microprocessor (170) to transmit a ranging resource signal including a ranging resource message (308, as discussed below) to the other base stations in the active set of the mobile station in respect of which the ranging initiator 298 is executed.

Figure 28:
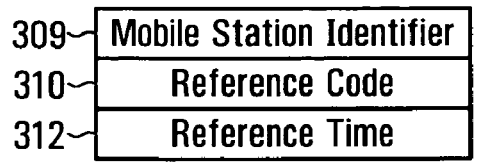
FIG. 28 is a schematic representation of an example ranging resource message sent by the base station control system of FIG. 14.

Referring to FIG. 28, an exemplary ranging resource message is shown generally at 308. The ranging resource message 308 includes a mobile station identifier field 309 for storing an identifier of the mobile station in respect of which the ranging initiator 298 is executed, a reference code field 310 for storing the reference code determined at block 302 (shown in FIG. 27), and a reference time field 312 for storing the reference time determined at block 304 (shown in FIG. 27).

Referring back to FIG. 27, the ranging initiator 298 continues at block 314, which directs the microprocessor (170) to transmit a ranging command signal including a ranging command message (316, as discussed below) to the mobile station in respect of which the ranging initiator 298 is executed.

Figure 29:
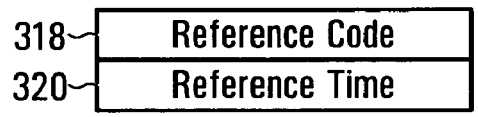
FIG. 29 is a schematic representation of an example ranging command message sent by the base station control system of FIG. 14.

Referring to FIG. 29, an exemplary ranging command message is shown generally at 316. The ranging command message 316 includes a reference code field 318 for storing the reference code determined at block 302 (shown in FIG. 27), and a reference time field 320 for storing the reference time determined at block 304 (shown in FIG. 27).

Figure 30:
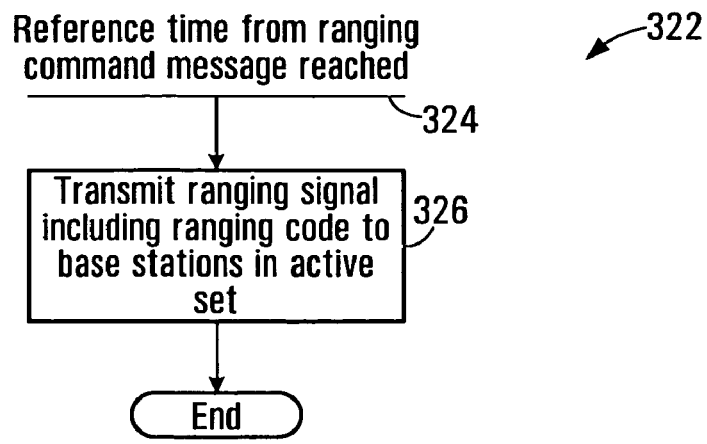
FIG. 30 is a block diagram of example ranging codes executed by the microprocessor of FIG. 15.

Referring back to FIG. 15, the program memory 182 includes codes for a ranger 322. Referring to FIG. 30, the ranger 322 is illustrated schematically, and begins at 324 when the reference time specified by the reference time field 320 of the ranging command message 316 (illustrated in FIG. 29) received at the mobile station 161 is reached. The ranger 322 continues at block 326, which directs the microprocessor 180 (shown in FIG. 15) to transmit a ranging signal, including the reference code specified by the reference code field 318 of the ranging command message 316 (shown in FIG. 29), to the base stations in the active set of the mobile station 161. The ranger 322 then ends. In alternative embodiments, the ranger 322 may begin at a particular time interval before the reference time specified by the reference time field (320) in order to cause the ranging signal to be received at the base stations in the active set of the mobile station 161 closer in time to the reference time specified by the reference time field (320). This particular time interval may, for example, reflect anticipated signal transmission time based on estimated distances to the base stations in the active set, or based on previously acquired data reflecting such distances.

The base stations in the active set of the mobile station 161 therefore receive the ranging signal, including the ranging code, transmitted in response to the codes of block 326, and these base stations each receive the ranging signal at a respective time. Referring back to FIG. 27, the ranging initiator 298 continues at block 328, which directs the microprocessor 170 (shown in FIG. 14) to calculate a difference in time between the reference time determined at block 304 and the time when the base station 141 received the ranging signal transmitted from the mobile station in response to the codes at block 326 (shown in FIG. 30).

The other base stations in the active set of the mobile station 161 also calculate respective differences in time between the reference time and the respective time when the base station in the active set received the ranging signal in response to the codes at block 326 (illustrated in FIG. 30), and those other base stations transmit to the base station 141 respective offset signals including respective offset messages (330, as discussed below) identifying the respective difference in time calculated at that base station.

Figure 31:
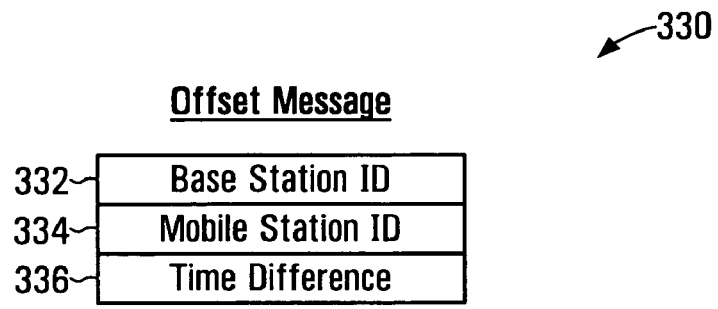
FIG. 31 is a schematic representation of an example offset message sent by the base station control system of FIG. 14.

Referring to FIG. 31, an exemplary offset message is shown generally at 330, and includes a base station identifier field 332 identifying the base station at which the time difference was calculated, a mobile station identifier field 334 identifying the mobile station in respect of which the time difference was calculated, and a time difference field 336 identifying the time difference calculated as described above.

Referring back to FIG. 27, the ranging initiator 298 continues at block 338, which directs the microprocessor 170 (shown in FIG. 14) to receive the various offset messages 330 (shown in FIG. 31) from the other base stations in the active set of the mobile station in respect of which the ranging initiator 298 is executed. The ranging initiator 298 then continues at block 340, which directs the microprocessor (170) to transmit a ranging control signal including a ranging control message (344 or 348, as discussed below) to the mobile station in respect of which the ranging initiator 298 is executed.

Referring back to FIG. 14, the data memory 174 includes a ranging mode store 342 for storing an indicator of a ranging mode of the base station 141. The ranging mode indicated by the ranging mode store 342 in the embodiment shown may be a single ranging parameter mode or a multiple ranging parameter mode. The ranging mode identified by the ranging mode store 342 may be preconfigured, or may alternatively be configured from time to time.

Figure 32:
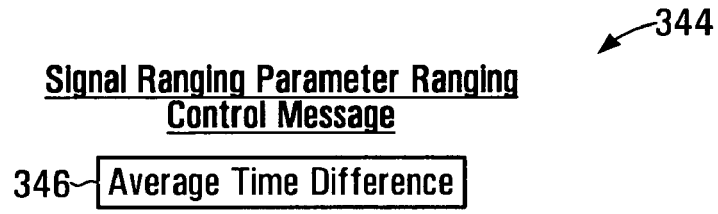
FIG. 32 is a schematic representation of an example single ranging parameter ranging control message sent by the base station control system of FIG. 14.

Referring to FIG. 32, a single ranging parameter ranging control message is shown generally at 344, and includes an average time difference field 346. When the ranging mode store (342) indicates the single ranging parameter ranging mode, the codes at block 340 direct the microprocessor (170) to calculate an average of the time differences received in blocks 328 and 338 (shown in FIG. 27), store the average in the average time difference field 346 of the single ranging parameter ranging control message 344, and transmit the single ranging parameter ranging control message 344 to the mobile station in respect of which the ranging initiator 298 is executed.

Figure 33:
FIG. 33 is a schematic representation of an example multiple ranging parameter ranging control message sent by the base station control system of FIG. 14.

Alternatively, when the ranging mode store 342 indicates a multiple ranging parameter ranging mode, the codes at block 340 (shown in FIG. 27) direct the microprocessor (170) to generate a multiple ranging parameter ranging control message, and an exemplary multiple parameter ranging control message is shown generally at 348 in FIG. 33. Referring to FIG. 33, the multiple ranging parameter ranging control message 348 includes at least one base station identifier 350 identifying each of the base stations in the active set of the mobile station in respect of which the ranging initiator 298 is executed, and a plurality of time difference fields 352, each time difference field corresponding to one of the base station identifiers 350 and storing the time difference associated with the base station as received in blocks 328 and 338 (shown in FIG. 27). When the ranging mode store 342 indicates a multiple ranging parameter ranging mode, the codes at block 340 (shown in FIG. 27) direct the microprocessor (170) to generate a multiple ranging parameter ranging control message 348 and transmit the multiple ranging parameter ranging control message 348 to the mobile station in respect of which the ranging initiator 298 is executed.

As indicated above, in alternative embodiments, active sets may exclude the anchor base stations but include none, some, or all of the neighbor base stations of the anchor base station and/or one or more relay stations. In these embodiments, the codes at block 328 may be omitted, and the codes at block 340 would exclude the time differences received at block 328.

Referring back to FIG. 15, the data memory 184 includes a ranging data store 354 for storing ranging data received from ranging control messages (344 and 348) transmitted at block 340 (shown in FIG. 27). The mobile station 161 refers to ranging data in the ranging data store 354 to facilitate transmission of uplink signals to be received at various base stations in the active set of the mobile station 161 at times based on the ranging data, to facilitate arrival of the signals close to times that may be assigned, thereby avoiding interference with uplink signals from other mobile stations. Advantageously, the process described above maintains periodically updated ranging data in the ranging data store 354 of the mobile station 161 for the base stations that the mobile station 161 has identified for its active set in the active set store 200, thereby facilitating efficient handover of the mobile station from an anchored base station to a target base station within the active set of base stations.

Handover Acknowledgment

Referring back to FIG. 1, as indicated above, one of the mobile stations 161, 162, 163, 164, and 165 may, from time to time, initiate a handover from its anchor base station to another one of the base stations. In various embodiments, different criteria may be involved in the determination of when a mobile station will initiate a handover from its anchor base station to a target base station, but these criteria often include relative signal strength of the anchor base station and the target base station, services available from the anchor base station and the target base station, wireless operators of the anchor station and the target base station, and recommended target base stations transmitted by the anchor base station, for example. In one embodiment according to the IEEE 802.16e Standard, mobile stations and base stations exchange various control messages, such as MOB_BSHO-REQ, MOB_MSHO-REQ, MOB_BSHO-RSP, and MOB_HO-IND messages to communicate information and determinations regarding handovers.

Referring back to FIG. 15, the program memory 182 includes codes for a handover handler 356 generally for making determinations of when to initiate a handover from a current anchor base station to a target anchor base station, and for implementing such a determination.

Figure 34:
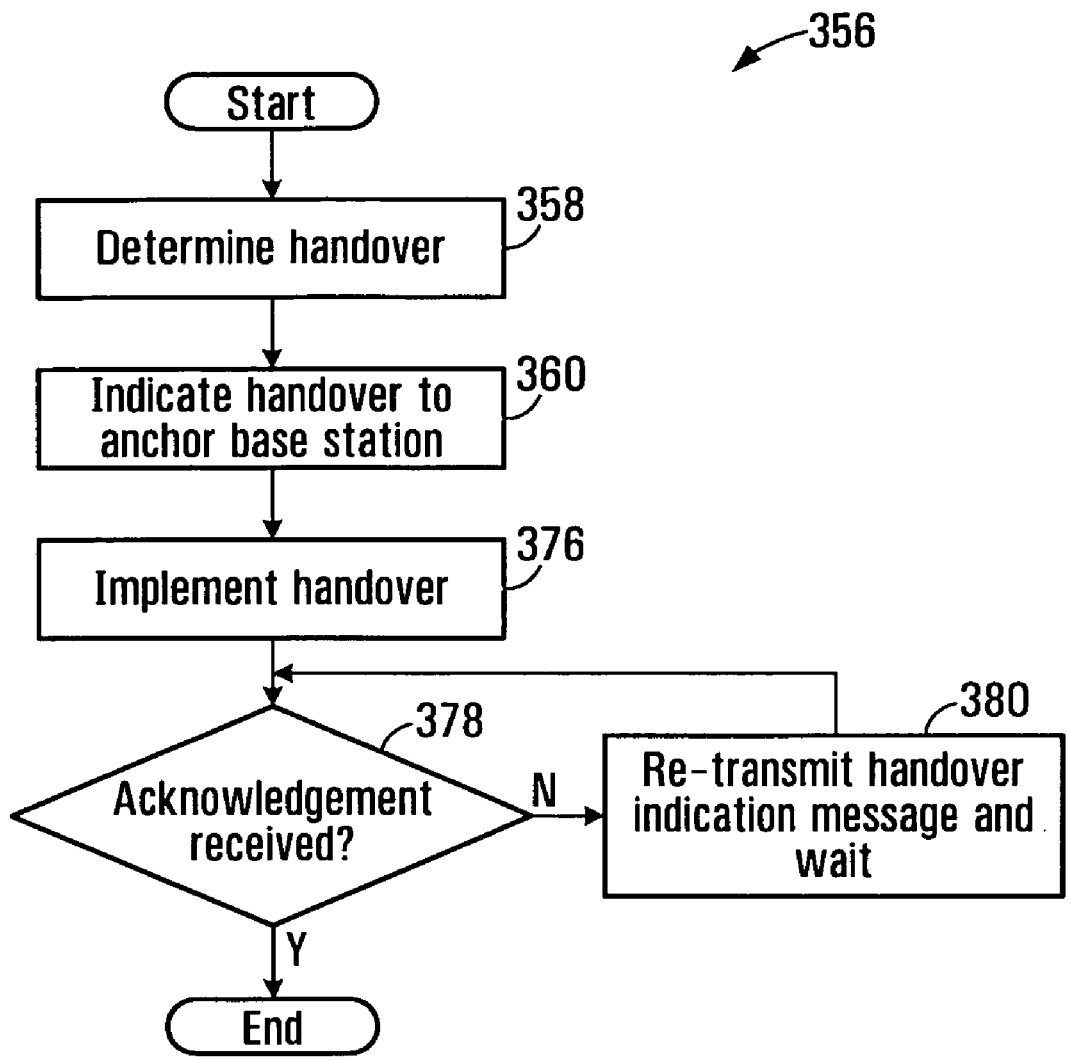
FIG. 34 is a block diagram of example handover codes executed by the microprocessor of FIG. 15.

Referring to FIG. 34, the handover handler 356 is illustrated schematically, and begins at block 358, which includes codes for directing the microprocessor 180 (shown in FIG. 15) to determine that a handover will be made from an anchor base station of the mobile station 161 to a target base station. The codes at block 358 may implement one or more of the aforementioned criteria or other criteria for determining that a handover will take place.

The handover handler 356 continues at block 360, which directs the microprocessor (180) to transmit, to the anchor base station, a handover indication signal including a handover indication message (362, as discussed below) that the handover determined at block 358 will take place.

Figure 35:
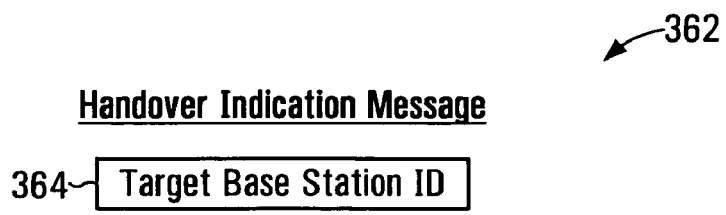
FIG. 35 is a schematic representation of an example handover indication message sent by the mobile station control system of FIG. 15.

Referring to FIG. 35, an exemplary handover indication message is shown generally at 362, and includes a target base station identifier field 364 for storing an identifier of the target base station determined at block 358 (shown in FIG. 34).

Figure 36:
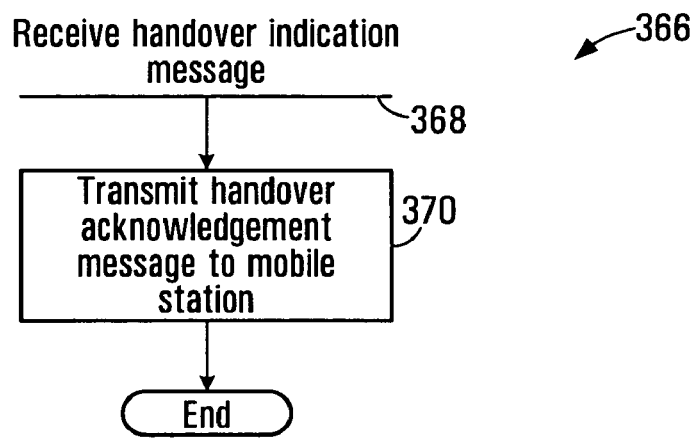
FIG. 36 is a block diagram of example handover acknowledger codes executed by the microprocessor of FIG. 14.

Referring back to FIG. 14, the program memory 172 includes codes for a handover acknowledger 366. Referring to FIG. 36, the handover acknowledger 366 is illustrated schematically, and begins at 368 when the base station 141 receives the handover indication message 362 (illustrated in FIG. 35) that was transmitted from the mobile station at block 360 (illustrated in FIG. 34). The handover acknowledger 366 continues at block 370, which directs the microprocessor 170 (shown in FIG. 14) to transmit a handover acknowledgement signal including a handover acknowledgement message (372, as discussed below) to the mobile station sent the handover indication message that was received at 368.

Figure 37:
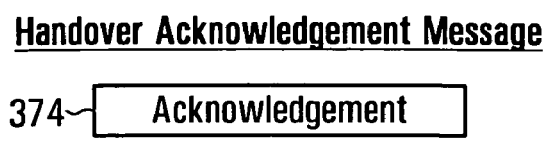
FIG. 37 is a schematic representation of an example handover acknowledgment message sent by the base station control system of FIG. 14.

Referring to FIG. 37, an exemplary handover acknowledgement message is shown schematically at 372, and includes an acknowledgment field 374. In the illustrated embodiment, the acknowledgment field includes a binary flag set to 1 if the handover indication message received at 368 was received without error, and set to 0 if the handover indication message received at 368 was received with some error.

Referring back to FIG. 34, the handover handler 356 continues at block 376, which directs the microprocessor 180 (shown in FIG. 15) to implement the handover determined at block 358. The handover may be implemented by one of many known protocols, such as the protocols established in the IEEE 802.16e Standard, for example.

The handover handler 356 continues at block 378, which directs the microprocessor (180) to determine whether the mobile station 161 has received the handover acknowledgment message 372 (shown in FIG. 37) transmitted by the anchor base station 141 at block 370 (shown in FIG. 36). If so, the handover handler 356 ends. If not, the handover handler 356 continues at block 380, which directs the microprocessor (180) to retransmit the handover indicator message transmitted at block 360, and to wait a pre-defined period of time before returning to block 378. The blocks 378 and 380 thus repeat until the mobile station 161 has confirmed that the base station 141 received a handover indication message. Although the blocks 378 and 380 are executed after the block 376, the block 376 may be executed after the blocks 378 and 380 in other embodiments, thereby deferring the handover until the acknowledgement from the anchor base station is received. A handover indicator message retransmitted at block 378 may, in some cases, prevent the anchor base station 141 from continuing attempts to communicate with the base station 161 after the base station 161 has completed a handover to the target base station, which may advantageously prevent unnecessary interference and congestion. A handover indicator message retransmitted at block 378 may also ensure that the anchor base station notifies the target base station that the mobile station will perform a handover to the target base station, thereby advantageously preventing a communication interruption that may result if the target base station is not prepared to communicate with the mobile station because the anchor base station did not receive the handover indication message.

While the above provides specific examples of a communication system in which embodiments of the invention are implemented, it is to be understood that embodiments of the invention can be implemented with communications systems having architectures that are different than the specific example provided above, but that operate in a manner consistent with the implementation of the embodiments described herein.

While specific embodiments of the invention have been described and illustrated, such embodiments should be considered illustrative of the invention only and not as limiting the invention as construed in accordance with the accompanying claims.

What is claimed is:

1. A method of facilitating acquisition, by a mobile station in radio communication with an anchor base station, of data representing distances between the mobile station and base stations of an active set of base stations in radio communication with the mobile station, the active set including a subset of neighbor base stations of the anchor base station, the method comprising:
    transmitting, from the anchor base station to each other base station of the active set, a ranging resource signal identifying a reference code and a reference time associated with the mobile station;
    causing the mobile station to transmit a ranging signal including the reference code to each base station of the active set at a time in response to the reference time, such that each base station of the active set receives the ranging signal at a respective time;
    receiving, from each base station of the active set, a respective offset signal identifying a respective difference in time between the reference time and the respective time when the base station of the active set received the ranging signal; and
    transmitting, to the mobile station, a ranging control signal in response to the respective offset signals.

2. The method of claim 1 further comprising generating the reference code from a pseudo-randomly generated code.

3. The method of claim 1 wherein transmitting the ranging control signal comprises transmitting a ranging control signal representing an average of the respective differences in time between the reference time and the respective times when each base station of the active set received the ranging signal.

4. The method of claim 1 wherein transmitting the ranging control signal comprises transmitting a plurality of ranging control signals, each one of the plurality of ranging control signals associated with a respective base station of the active set and representing the respective difference in time between the reference time and the respective time when the base station of the active set received the ranging signal.

5. The method of claim 1 wherein the active set further includes the anchor base station.

6. A base station apparatus comprising:
    a first interface for facilitating radio communication with a mobile station;
    a second interface for facilitating communication with at least one neighbor base station in an active set in radio communication with the mobile station; and
    a processor in communication with the first and second interfaces, the processor operably configured to:
        cause the second interface to transmit, to the at least one neighbor base station in the active set, a ranging resource signal identifying a reference code and a reference time associated with the mobile station;
        cause the first interface to transmit, to the mobile station, a ranging command signal directing the mobile station to transmit a ranging signal including the reference code to each base station in the active set at a time in response to the reference time, such that each base station in the active set receives the ranging signal at a respective time;
        receive, from the second interface, a respective offset signal from each neighbor base station in the active set, each respective offset signal identifying a respective difference in time between the reference time and the respective time when the neighbor base station in the active set received the ranging signal; and
        cause the first interface to transmit, to the mobile station, a ranging control signal in response to each of the respective offset signals.

7. The apparatus of claim 6 wherein the processor is further operably configured to generate the reference code from a pseudo-randomly generated code.

8. The apparatus of claim 6 wherein the ranging control signal represents an average of each of the respective differences in time between the reference time and the respective time when each base station in the active set received the ranging signal.

9. The apparatus of claim 6 wherein the ranging control signal comprises a plurality of ranging control signals, each one of the plurality of ranging control signals associated with a respective one of each base station of the active set, and representing the respective difference in time between the reference time and the respective time when the respective base station received the ranging signal.

10. The apparatus of claim 6 wherein the active set further includes the apparatus, and wherein the processor is further operably configured to:
    receive, from the first interface, the ranging signal from the mobile station;
    calculate a difference in time between the reference time and a time when the apparatus received the ranging signal from the mobile station; and
    cause the first interface to transmit, to the mobile station, the ranging control signal in response to the difference in time between the reference time and the time when the apparatus received the ranging signal from the mobile station.

11. A base station apparatus configured for radio communication with a mobile station and for communication with at least one neighbor base station in an active set in radio communication with the mobile station, the apparatus comprising:

means for transmitting, to the at least one neighbor base station in the active set, a ranging resource signal identifying a reference code and a reference time associated with the mobile station;

means for transmitting, to the mobile station, a ranging command signal directing the mobile station to transmit a ranging signal including the reference code to each base station in the active set at a time in response to the reference time, such that each base station in the active set receives the ranging signal at a respective time;

means for receiving a respective offset signal from each base station in the active set, each respective offset signal identifying a respective difference in time between the reference time and the respective time when the base station in the active set received the ranging signal; and means for transmitting, to the mobile station, a ranging control signal in response to each of the respective offset signals.

* * * * *